(12) United States Patent
Yuasa et al.

(10) Patent No.: US 11,631,380 B2
(45) Date of Patent: Apr. 18, 2023

(54) INFORMATION PROCESSING APPARATUS, INFORMATION PROCESSING METHOD, AND RECORDING MEDIUM

(71) Applicant: SONY CORPORATION, Tokyo (JP)

(72) Inventors: Hiroshi Yuasa, Kanagawa (JP); Kazuma Aiki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/978,546

(22) PCT Filed: Mar. 1, 2019

(86) PCT No.: PCT/JP2019/008001
§ 371 (c)(1),
(2) Date: Sep. 4, 2020

(87) PCT Pub. No.: WO2019/176577
PCT Pub. Date: Sep. 19, 2019

(65) Prior Publication Data
US 2021/0020141 A1 Jan. 21, 2021

(30) Foreign Application Priority Data
Mar. 14, 2018 (JP) .............................. JP2018-046335

(51) Int. Cl.
*G09G 5/10* (2006.01)
*G06T 7/73* (2017.01)
(Continued)

(52) U.S. Cl.
CPC ............ *G09G 5/10* (2013.01); *G02B 27/0172* (2013.01); *G02B 27/283* (2013.01); *G06T 7/73* (2017.01);
(Continued)

(58) Field of Classification Search
CPC ............. G09G 5/10; G09G 2320/0666; G09G 2360/144; G06T 11/203; G02B 2027/014; H04N 5/2352
See application file for complete search history.

(56) References Cited

U.S. PATENT DOCUMENTS

2009/0189753 A1* 7/2009 Enya ...................... G02B 27/01
340/435
2011/0234977 A1* 9/2011 Verdooner ............. A61B 3/135
351/207
(Continued)

FOREIGN PATENT DOCUMENTS

CN 103946732 A 7/2014
EP 2761362 A2 8/2014
(Continued)

OTHER PUBLICATIONS

International Search Report and Written Opinion of PCT Application No. PCT/JP2019/002858, dated Apr. 23, 2019, 06 pages of ISRWO.
(Continued)

*Primary Examiner* — Grace Q Li
(74) *Attorney, Agent, or Firm* — Chip Law Group

(57) ABSTRACT

The present technology relates to an information processing apparatus and an information processing method enabling a user to visually recognize a surrounding environment promptly based on a sudden change in brightness. An information processing apparatus of the present technology includes an acquisition section that acquires environmental information which is information associated with an environment including an object present in a real space, and a display control section that exercises display control based on the environmental information with respect to form information representing a form of the object over a display section that displays predetermined information in a visually (Continued)

recognizable state while superimposing the predetermined information on the real space based on occurrence of a change in brightness of the real space higher than a threshold. The present technology is applicable to an HMD that displays information while superimposing the information on a scene in front of a user.

14 Claims, 30 Drawing Sheets

(51) Int. Cl.
  *G06T 11/20* (2006.01)
  *G02B 27/01* (2006.01)
  *G02B 27/28* (2006.01)
  *H04N 5/235* (2006.01)

(52) U.S. Cl.
  CPC ...... *G06T 11/203* (2013.01); *G02B 2027/014* (2013.01); *G02B 2027/0118* (2013.01); *G02B 2027/0178* (2013.01); *G09G 2320/0666* (2013.01); *G09G 2360/144* (2013.01); *H04N 5/2352* (2013.01)

(56) References Cited

U.S. PATENT DOCUMENTS

| | | | | |
|---|---|---|---|---|
| 2012/0182206 | A1* | 7/2012 | Cok | G02B 27/017 345/8 |
| 2015/0168723 | A1* | 6/2015 | Eto | H04N 13/344 348/51 |
| 2015/0175068 | A1* | 6/2015 | Szostak | B60K 35/00 340/435 |
| 2016/0062121 | A1 | 3/2016 | Border et al. | |
| 2016/0154242 | A1 | 6/2016 | Border | |
| 2016/0170208 | A1 | 6/2016 | Border et al. | |
| 2016/0170209 | A1 | 6/2016 | Border et al. | |
| 2016/0225186 | A1* | 8/2016 | Aliakseyeu | G01C 21/3647 |
| 2016/0231571 | A1 | 8/2016 | Border et al. | |
| 2017/0220863 | A1* | 8/2017 | Lection | G02B 27/0172 |
| 2017/0242251 | A1 | 8/2017 | Border et al. | |
| 2017/0242255 | A1 | 8/2017 | Border et al. | |
| 2017/0363872 | A1 | 12/2017 | Border et al. | |
| 2018/0012374 | A1* | 1/2018 | Fujita | G06T 7/80 |
| 2018/0017791 | A1 | 1/2018 | Beckman | |
| 2018/0078731 | A1* | 3/2018 | Wendt | H05B 47/125 |
| 2018/0088323 | A1* | 3/2018 | Bao | G02B 27/0093 |
| 2018/0120561 | A1* | 5/2018 | Liu | G06K 9/00671 |
| 2018/0373349 | A1 | 12/2018 | Okumura et al. | |
| 2020/0026076 | A1 | 1/2020 | Beckman | |
| 2020/0368616 | A1* | 11/2020 | Delamont | A63F 13/213 |

FOREIGN PATENT DOCUMENTS

| | | |
|---|---|---|
| JP | H05328259 A | 12/1993 |
| JP | 2011-085829 A | 4/2011 |
| JP | 2011-175035 A | 9/2011 |
| JP | 2015-504616 A | 2/2015 |
| JP | 2017-068000 A | 4/2017 |
| JP | 2017-102298 A | 6/2017 |
| KR | 10-2014-0066258 A | 5/2014 |
| WO | 2013/049248 A2 | 4/2013 |

OTHER PUBLICATIONS

Supplementary European Search Report of EP Application No. 19766764.5, dated Apr. 1, 2021, 10 pages.

* cited by examiner

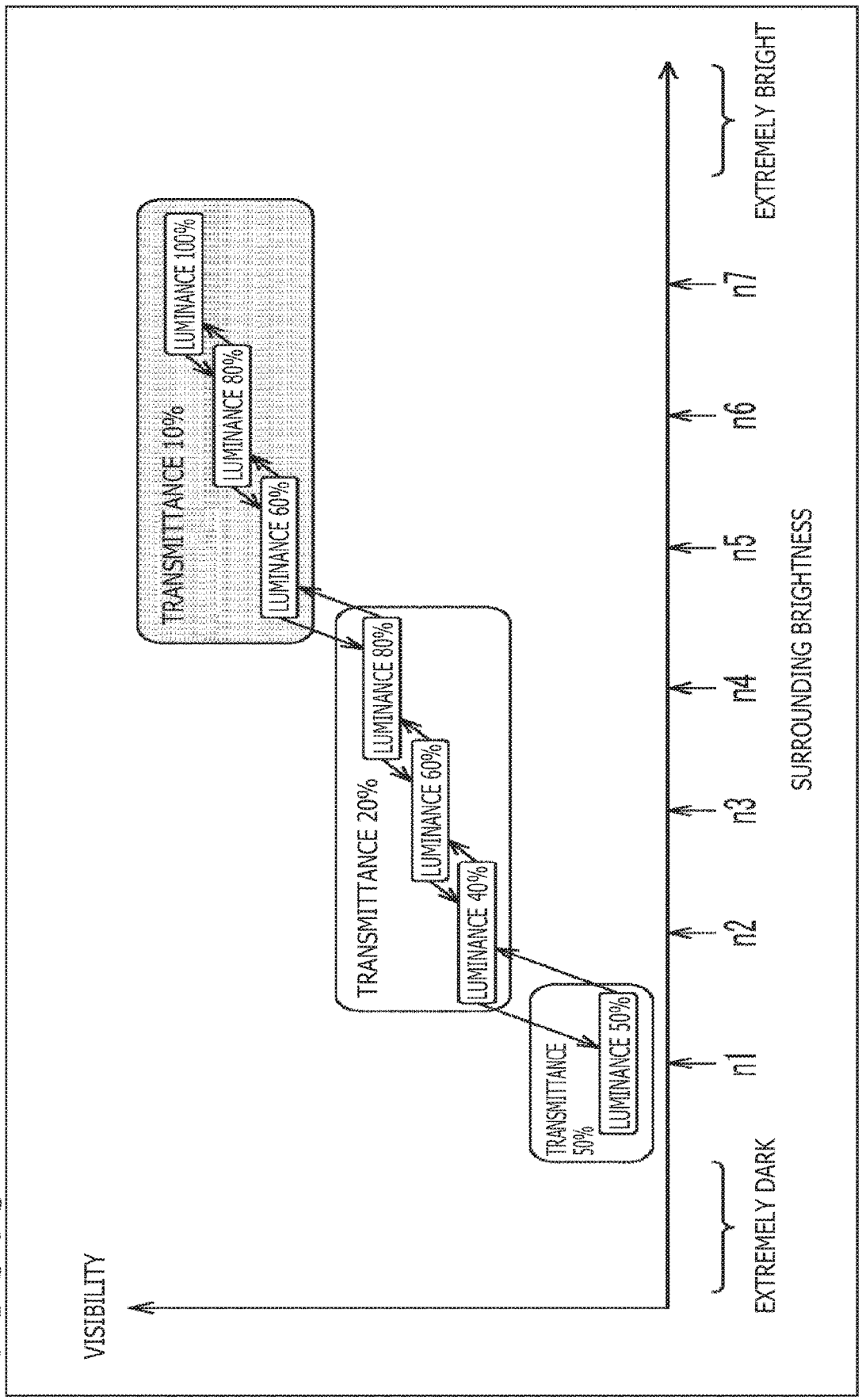

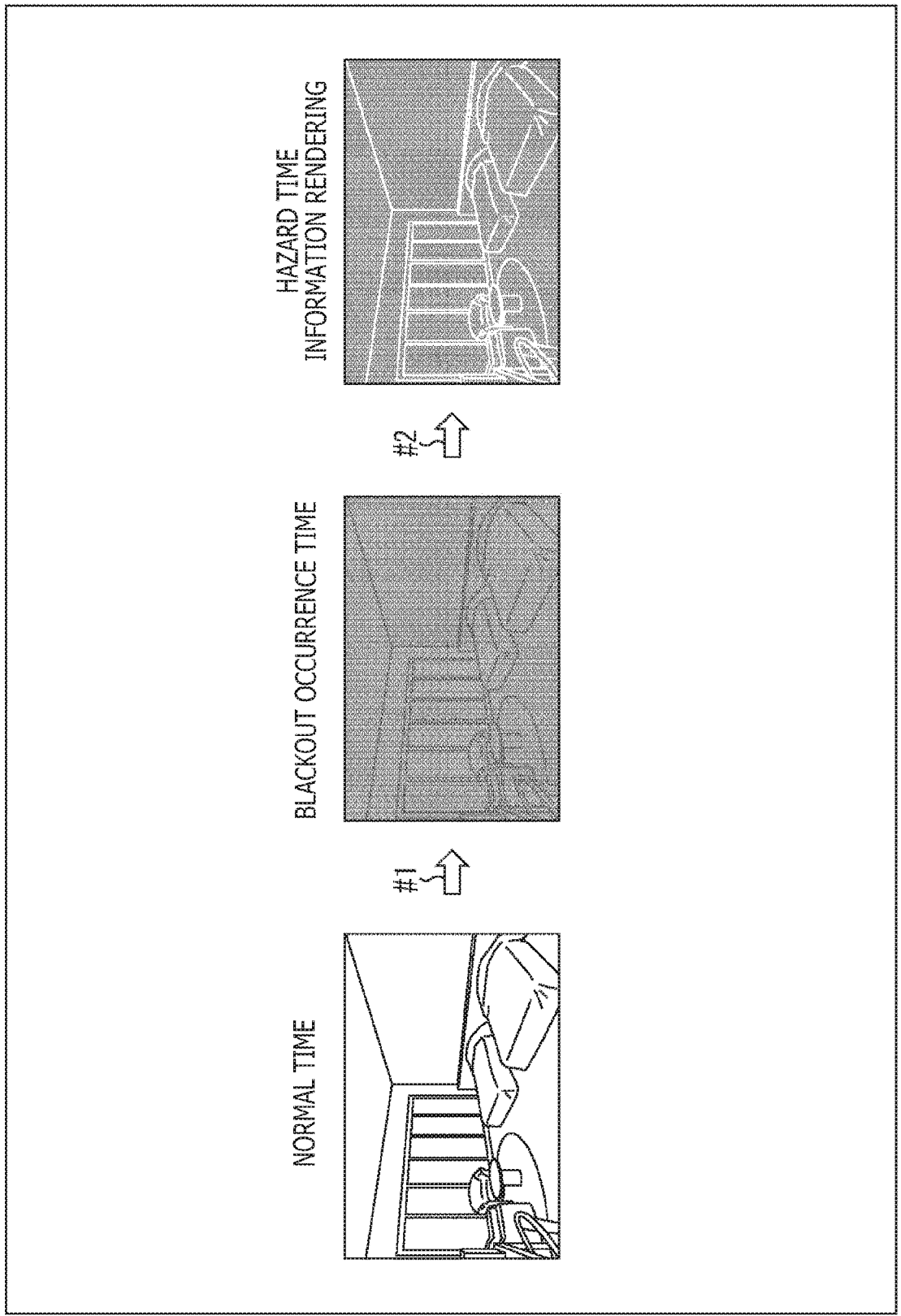

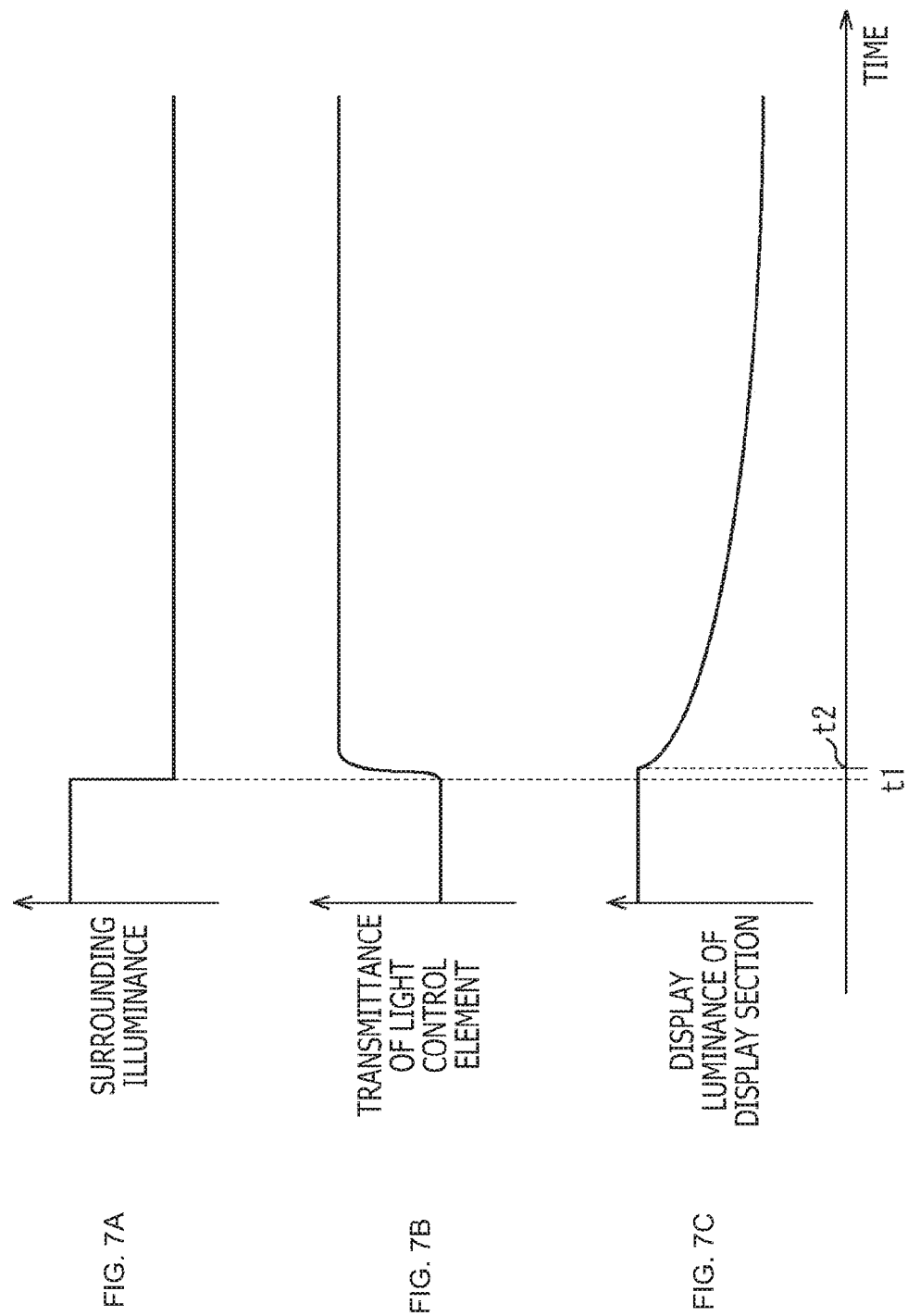

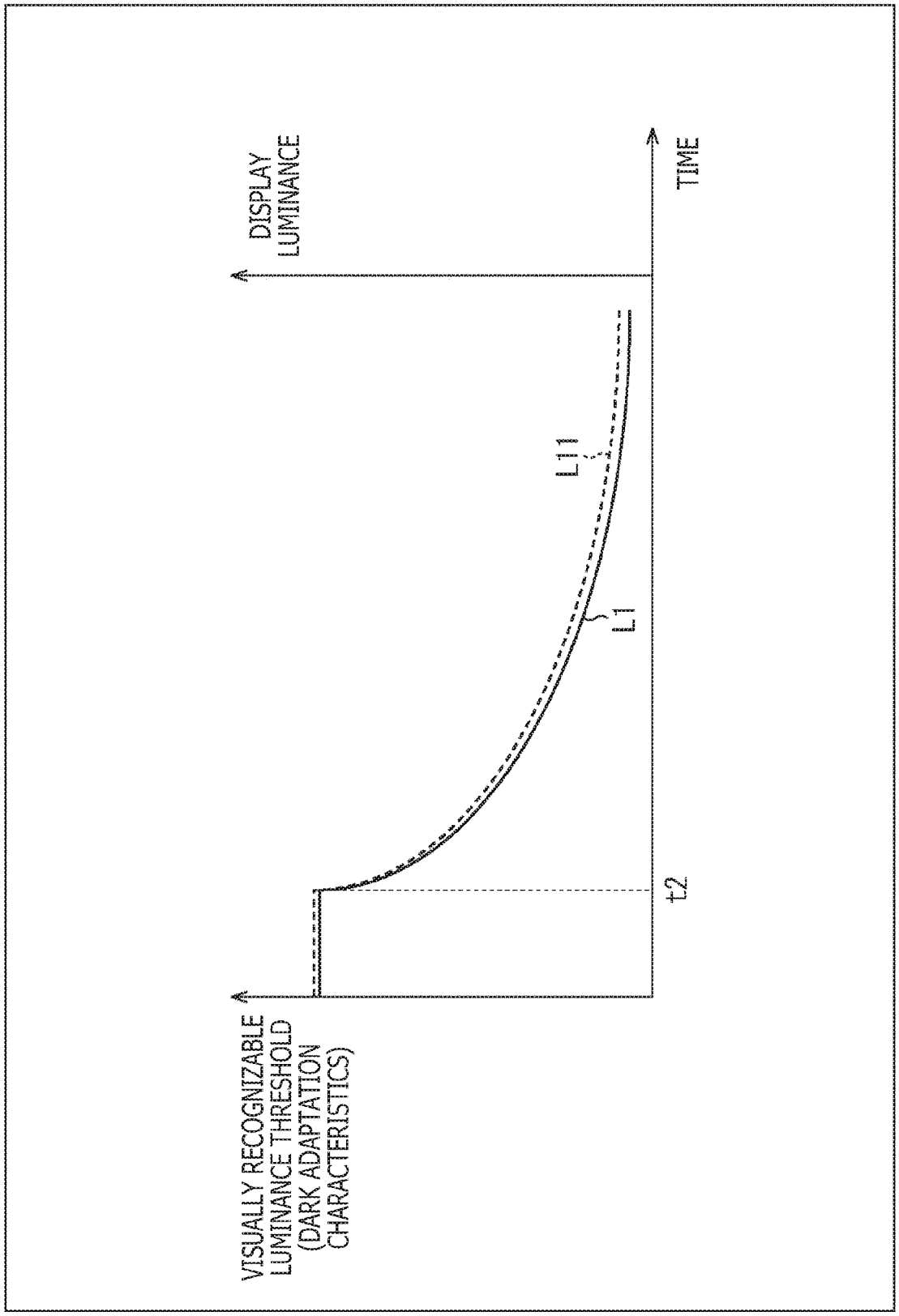

FIG. 10
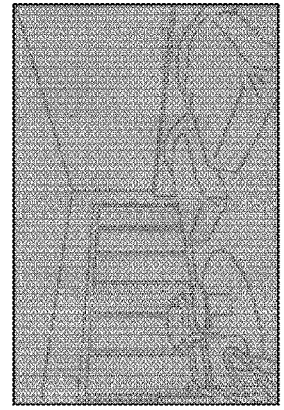
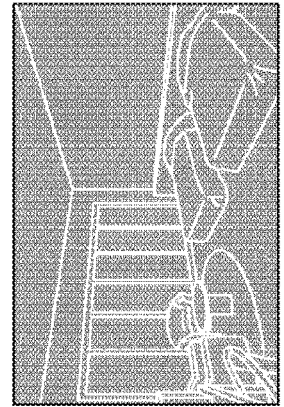
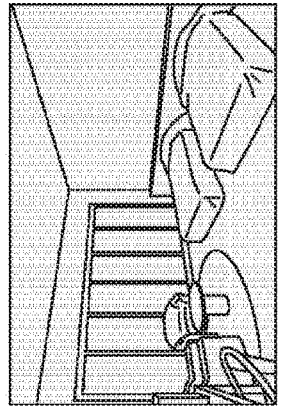
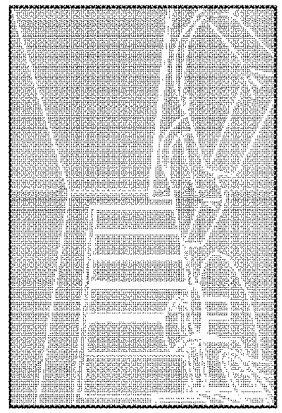
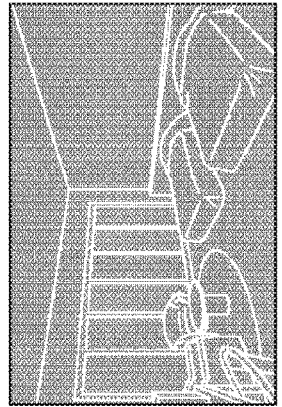

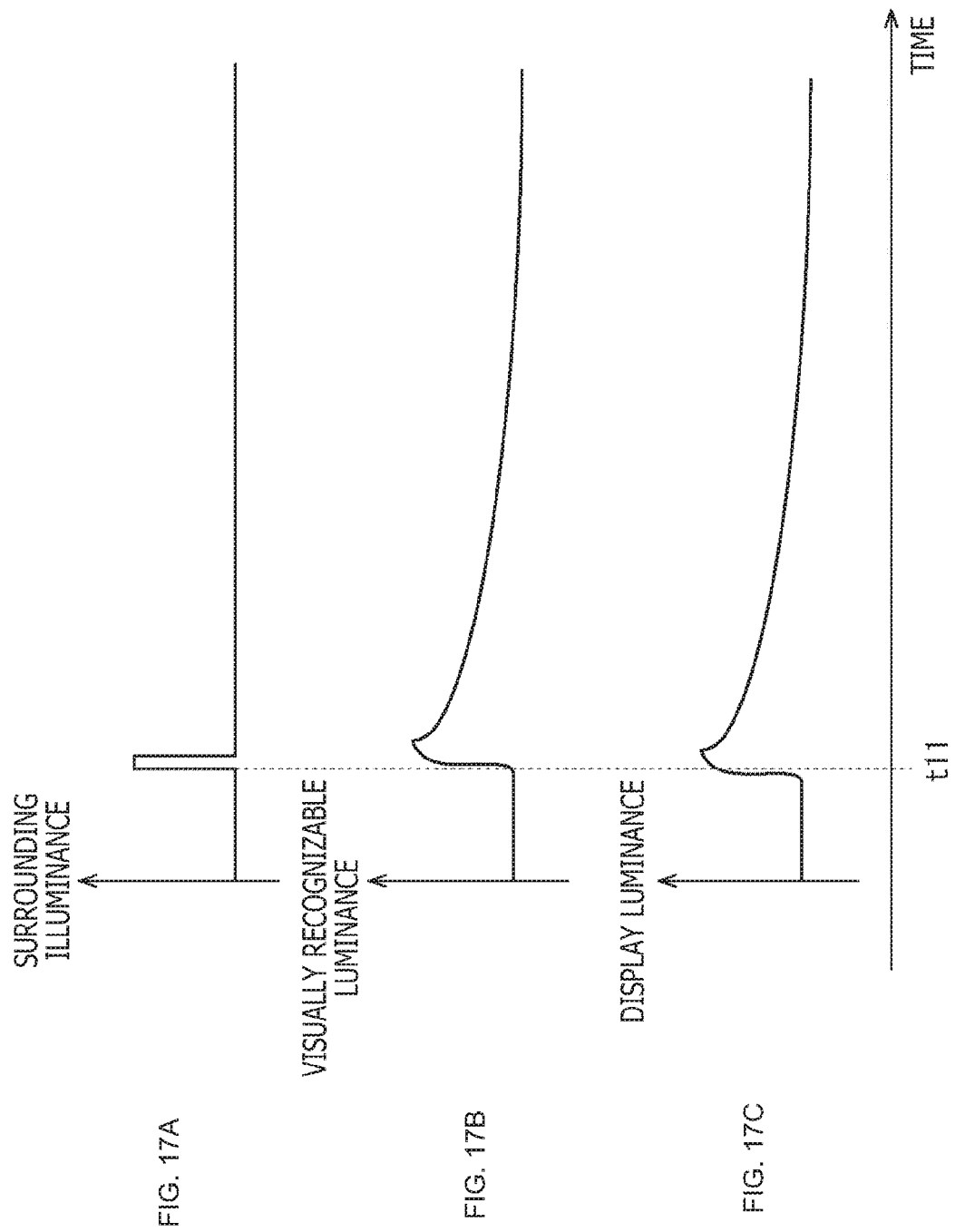

FIG. 18

| EVALUATION VALUE | 0 | 1 | 2 |
|---|---|---|---|
| | SITUATION | | |
| USER'S POSTURE | SEATED | STAND STILL | MOVING |
| USER'S MOVING SPEED | LOWER THAN 1 km/h | EQUAL TO OR HIGHER THAN 1 km/h AND EQUAL TO OR LONGER THAN 3 km/h | HIGHER THAN 3 km/h |
| IRREGULARITIES OF SURROUNDING OBJECT | SMALLER THAN 10 cm | EQUAL TO OR GREATER THAN 10 cm | |
| USER'S POSITION (DISTANCE TO SURROUNDING OBJECT) | GREATER THAN 2 m | EQUAL TO OR GREATER THAN 1 m AND EQUAL TO OR SMALLER THAN 2 m | SMALLER THAN 1 m |

LOW ⇔ DEGREE OF HAZARD ⇔ HIGH

FIG.19

| SUM OF EVALUATION VALUES | 0 | 1~2 | EQUAL TO OR HIGHER THAN 3 |
|---|---|---|---|
| RENDERING METHOD | | | |
| TYPE OF LINE | SOLID LINE | BROKEN LINE | |
| BLINKING LINE | ABSENT | | PRESENT |
| GRAY LEVEL | HALF OF MAXIMUM VALUE | | MAXIMUM |
| COLOR | GREEN | YELLOW | RED |
| THICKNESS | 1pix | 2pix | 3pix |
| DISPLAY OF FEATURE POINTS | ABSENT | PRESENT | |
| BLINKING FEATURE POINTS | ABSENT | | PRESENT |

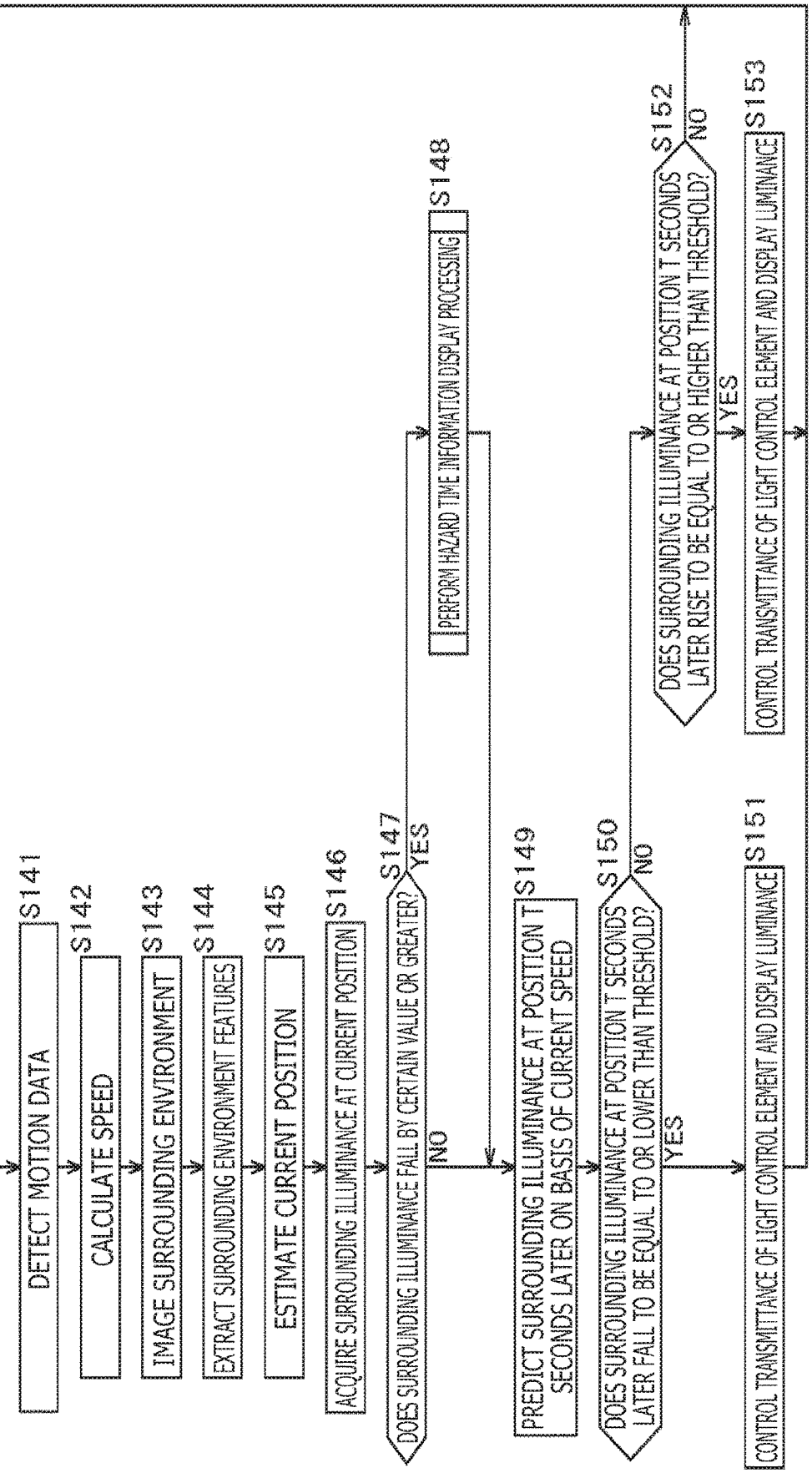

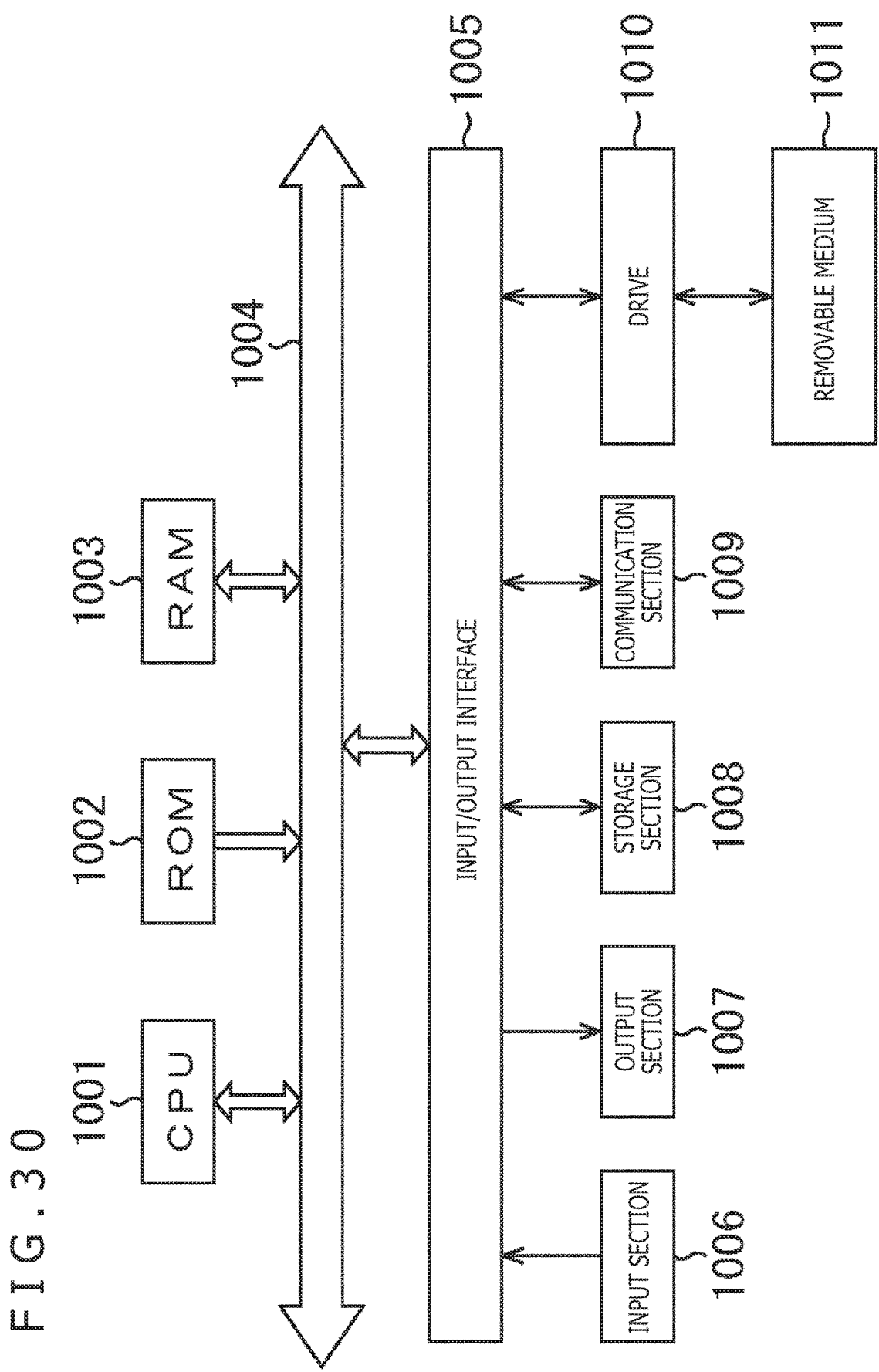

INFORMATION PROCESSING APPARATUS, INFORMATION PROCESSING METHOD, AND RECORDING MEDIUM

CROSS REFERENCE TO RELATED APPLICATIONS

This application is a U.S. National Phase of International Patent Application No. PCT/JP2019/008001 filed on Mar. 1, 2019, which claims priority benefit of Japanese Patent Application No. JP 2018-046335 filed in the Japan Patent Office on Mar. 14, 2018. Each of the above-referenced applications is hereby incorporated herein by reference in its entirety.

TECHNICAL FIELD

The present technology relates to an information processing apparatus, an information processing method, and a recording medium, and particularly relates to an information processing apparatus, an information processing method, and a recording medium enabling a user to visually recognize a surrounding environment promptly in a case of a sudden change in brightness.

BACKGROUND ART

Attention is currently paid to AR (Augmented Reality) for superimposing information such as images and characters on a scene in front of a user to display the information. As a device for realizing the AR, there is known a transmission HMD (Head Mounted Display) for superimposing video light for displaying the information on outside light and allowing the user to visually recognize the information.

PTL 1 discloses a technology for preventing visibility to outside world from being disturbed by instantly lowering luminance of video light in a case of detecting a sudden fall in the outside light. The technology enables the information to be displayed continuously by the video light in a state of lowering the luminance without disturbing the visibility to the outside world.

CITATION LIST

Patent Literature

[PTL 1]
JP 2017-68000A

SUMMARY

Technical Problems

In a case of the sudden fall in the outside light, dark adaptation occurs to user's visual sensation, and it takes a certain period of time for the user to be able to visually recognize a dark environment. The user is unable to recognize outside world information until being able to visually recognize the dark environment.

Furthermore, in the case of the sudden fall in the outside light, it is unnecessary for the user to continue visually recognizing the same information as the information displayed before the fall in the outside light from the viewpoint of user's safety.

The present technology has been achieved in light of such circumferences, and an object of the present technology is to enable a user to visually recognize a surrounding environment promptly in a case of a sudden change in brightness.

Solution to Problems

An information processing apparatus according to one aspect of the present technology includes an acquisition section that acquires environmental information that includes information associated with an environment including an object present in a real space, and a display control section that exercises display control based on the environmental information with respect to form information representing a form of the object over a display section that displays predetermined information in a visually recognizable state while superimposing the predetermined information on the real space in a case of occurrence of a change in brightness of the real space higher than a threshold.

According to one aspect of the present technology, environmental information which includes information associated with an environment including an object present in a real space is acquired, and display control based on the environmental information with respect to form information representing a form of the object is exercised over a display section that displays predetermined information in a visually recognizable state while superimposing the predetermined information on the real space in a case of occurrence of a change in brightness of the real space higher than a threshold.

Advantageous Effect of Invention

According to the present technology, a user is allowed to visually recognize a surrounding environment promptly in a case of a sudden change in brightness.

Note that the effect described herein is not necessarily limited and may be any effects described in the present disclosure.

BRIEF DESCRIPTION OF DRAWINGS

FIG. 5 is a diagram depicting an example of setting transmittance and display luminance.

FIG. 6 is a diagram depicting an example of displaying hazard time information.

FIGS. 7A, 7B, and 7C depict diagrams of an example of setting transmittance and display luminance for use in displaying the hazard time information.

FIG. 8 is a diagram depicting an example of a change in the display luminance.

FIG. 10 is a diagram depicting an example of how the user views a scene when the user has removed an HMD.

FIGS. 17A, 17B, and 17C depict diagrams of an example of setting the display luminance.

FIG. 18 is a diagram depicting an example of evaluation values for use in evaluating a degree of hazard.

FIG. 19 is a diagram depicting an example of display according to the degree of hazard.

FIG. 29 is a flowchart illustrating display control processing by the HMD having the configurations of FIG. 28.

FIG. 30 is a block diagram depicting an example of configurations of a computer.

DESCRIPTION OF EMBODIMENTS

Modes for carrying out the present technology will hereinafter be described. Description will be given in the following order.

1. First embodiment (example of case of sudden change in surrounding brightness)
2. Second embodiment (example of case of gentle change in surrounding brightness)

First Embodiment: Example of Case of Sudden Change in Surrounding Brightness

<Information Processing System>

Figure 1:
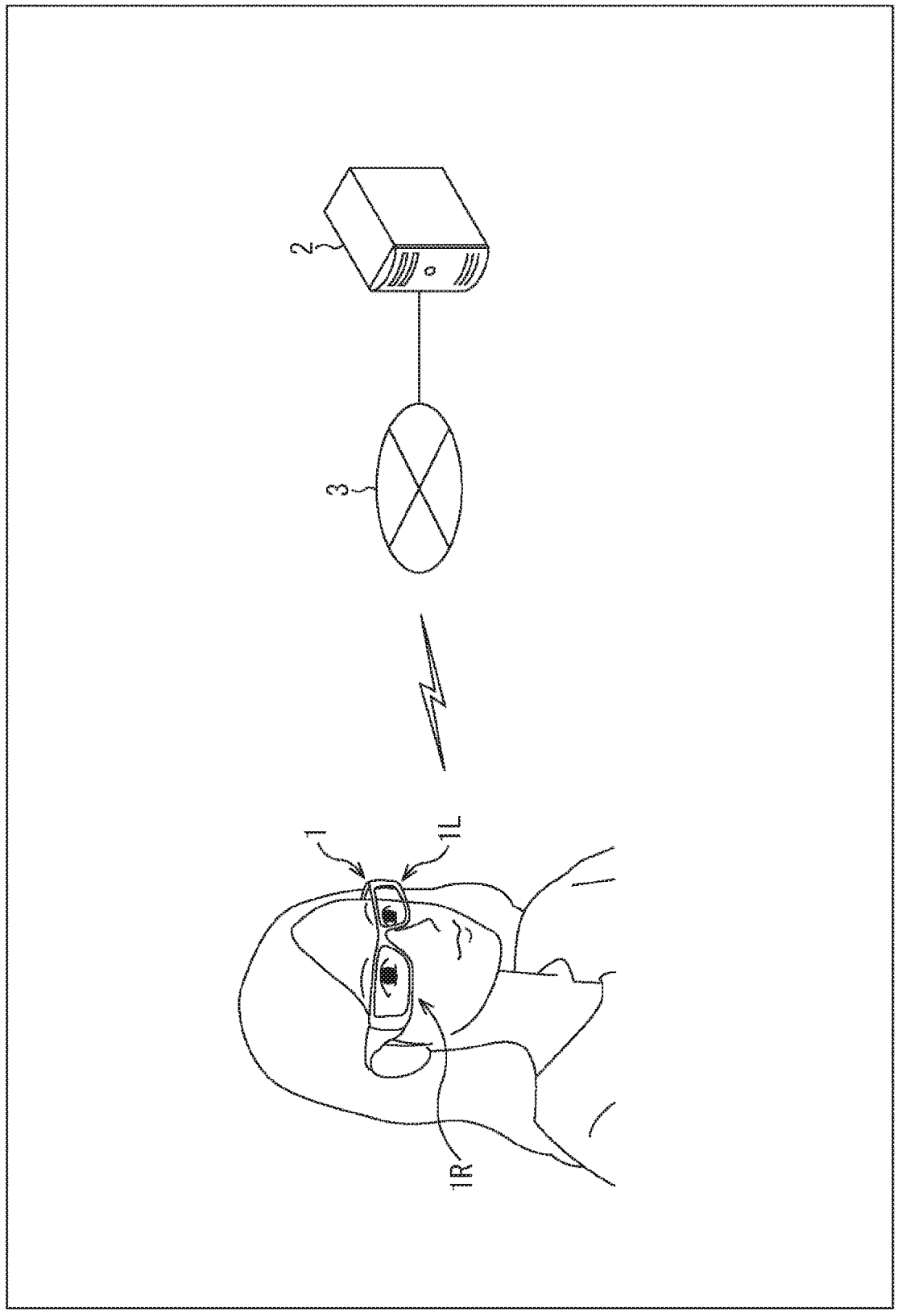
FIG. 1 is a diagram depicting an example of configurations of an information processing system according to one embodiment of the present technology.

FIG. 1 is a diagram depicting an example of configurations of an information processing system according to one embodiment of the present technology.

The information processing system of FIG. 1 is configured by connecting an HMD (Head Mounted Display) 1 serving as an information processing apparatus to a content delivery server 2 via a network 3 such as the Internet. Transmission and reception of data between the HMD 1 and the content delivery server 2 may be performed via a mobile terminal such as a smartphone or a tablet terminal held by a user.

The HMD 1 is an eyeglass type wearable terminal configured with a transmission display device. A right eye optical system 1R guiding light of various kinds of information (video light) together with outside light to a right eye of the user wearing the HMD 1 on the head is provided in front of the user's right eye, and a left eye optical system 1L guiding the light of the various kinds of information together with the outside light to a user's left eye is provided in front of the user's left eye.

The HMD 1 communicates with the content delivery server 2 via the network 3 and receives data transmitted from the content delivery server 2. The HMD 1 displays (renders) various kinds of information such as images and characters on the basis of the data transmitted from the content delivery server 2 and presents the various kinds of information to the user.

The user is to view the various kinds of information while the various kinds of information are superimposed on a scene in front of the user. In such a way, the HMD 1 is a wearable terminal for use in AR (Augmented Reality).

A projection scheme of the HMD 1 may be a virtual image projection scheme or a retina projection scheme for directly forming an image on retinas of the user's eyes.

Information to be displayed by the HMD 1 is not limited to information displayed on the basis of the data transmitted from the content delivery server 2. For example, information stored in a memory mounted in the HMD 1 is displayed by the HMD 1. Furthermore, data stored in the user's mobile terminal and/or data stored in a PC (Personal Computer) is acquired by the HMD 1, and the HMD 1 displays the various kinds of information.

Figure 2:
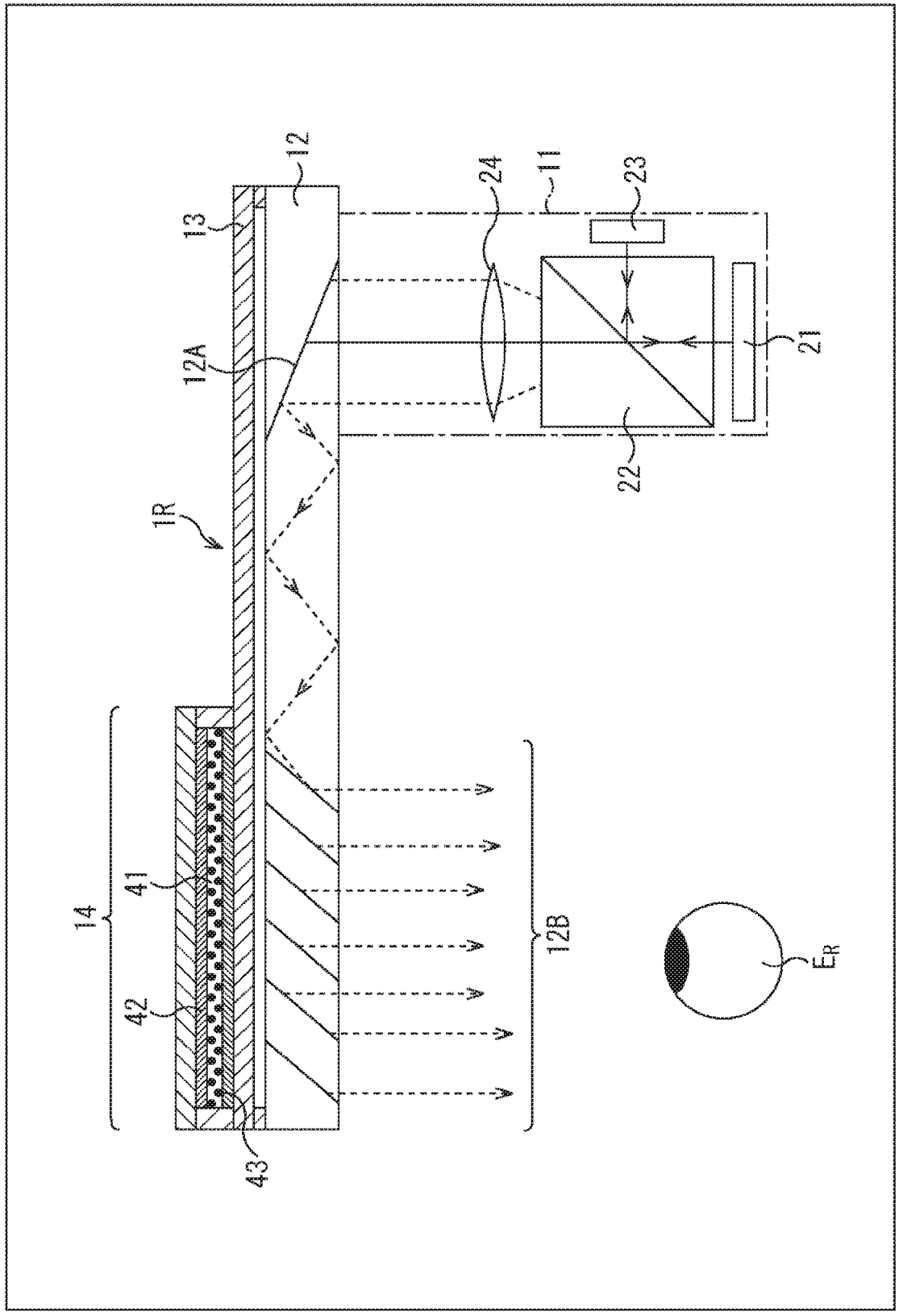
FIG. 2 is a diagram depicting configurations near a right eye optical system.

FIG. 2 is a diagram depicting configurations near the right eye optical system 1R. Main configurations will be described.

As depicted in FIG. 2, the right eye optical system 1R is configured by bonding a transparent substrate 13 such as a glass onto a front surface of a light guide plate 12 configured with a transparent member. A display section 11 is provided in a temple section (not depicted) extending from a rim fixing the right eye optical system 1R, and a light control element 14 is provided at a position closer to the left eye optical system 1L on a front surface of the right eye optical system 1R.

As indicated by a dot-and-dash line surrounding the display section 11, the display section 11 is configured with a display device 21, a polarization beam splitter 22, a light source 23, and a lens 24.

The display device 21 is configured by a reflective display device configured by an LCD (Liquid Crystal Display) or the like, or by a spontaneous light emitting display device such as an organic EL (Electro Luminescence) display. Various kinds of information such as images and characters to be presented to the user are displayed on the display device 21. The display device 21 is, for example, a color display-enabled device.

The polarization beam splitter 22 reflects part of light from the light source 23 and guides the reflected light to the display device 21. The polarization beam splitter 22 also allows part of the light emitted from the display device 21 to pass therethrough and guides the light to the light guide plate 12 via the lens 24.

A deflection section 12A and a deflection section 12B that is a multilayer stacked structure body in which many dielectric stacked films are stacked are configured within the light guide plate 12. The deflection section 12A is configured by an aluminum film or the like, while each of the dielectric stacked films configuring the deflection section 12B is configured with a $TiO_2$ film as a high dielectric material and an $SiO_2$ film as a low dielectric material.

The light emitted from the display device 21 and guided via the polarization beam splitter 22 is reflected by the deflection section 12A toward an interior of the light guide plate 12. The light reflected by the deflection section 12A is propagated by being totally reflected by the interior of the light guide plate 12, reflected by the deflection section 12B, and then emitted toward a user's right eye ER. Video light representing display content of the display device 21 is thereby guided to the user's right eye ER.

The light control element 14 is configured by putting an electrochromic element 41 between transparent electrodes 42 and 43. An oxidation reaction and a reduction reaction of the electrochromic element 41 are produced according to voltages applied to the transparent electrodes 42 and 43, and transmittance of the light control element 14 is controlled.

The voltages applied to the transparent electrodes 42 and 43 are controlled according to surrounding illuminance detected by, for example, an illuminance sensor provided in the HMD 1. Light from outside is transmitted through the light control element 14 having the transmittance adjusted according to the surrounding illuminance, and then guided to the user's right eye ER.

Same configurations as those depicted in FIG. 2 are provided in the left eye optical system 1L at positions symmetrical to those of the configurations depicted in FIG. 2. Information of the same content as the display content of the display device 21 in the right eye optical system 1R is displayed on a display device provided in the left eye optical system 1L, and video light is delivered to the user's left eye.

Details of the head mounted display having such configurations are disclosed in, for example, JP 2012-252091A and JP 2013-5201A.

In such a way, information is displayed by the HMD 1 while adjusting each of display luminance of the display section 11 and the transmittance of the light control element 14. The display luminance is luminance for use in the display section 11 for displaying information.

Adjusting the display luminance of the display section 11 according to the display content and user's visual sensation characteristics and keeping low the luminance as appropriate enable a prolonged life of the display device 21. In addition, adjusting the transmittance of the light control element 14 and mitigating a change in the outside light as appropriate make it possible to ensure visibility of information.

Example of Displaying Information

Figure 3:
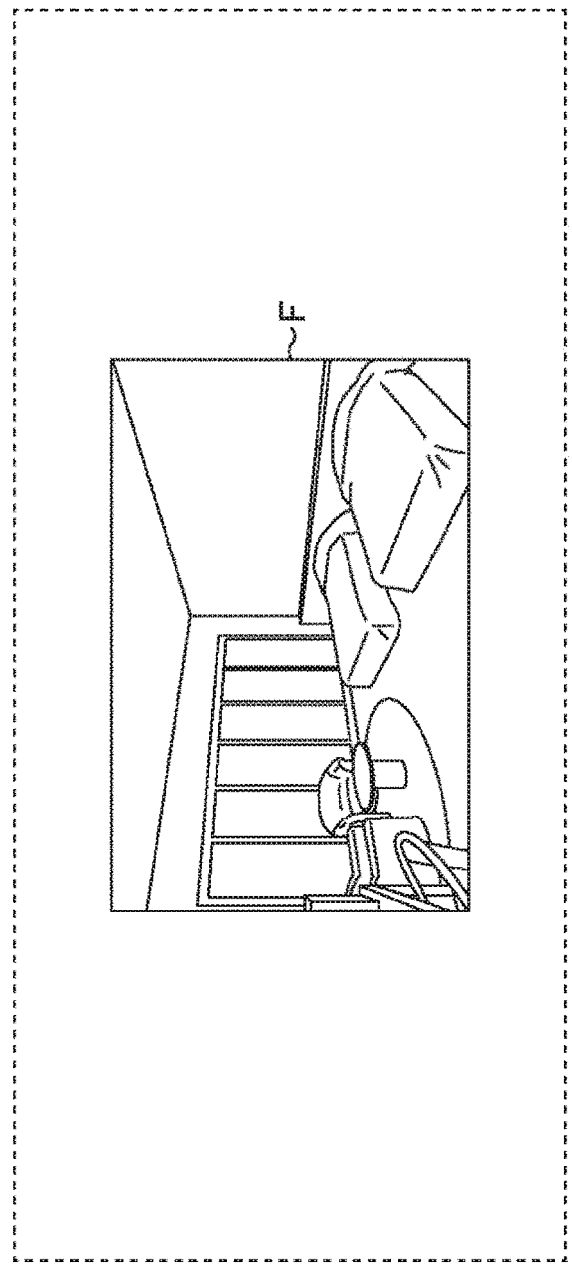
FIG. 3 is a diagram depicting an example of how a user views a scene.

FIG. 3 is a diagram depicting an example of how the user views a scene.

A state depicted in FIG. 3 is a state in which none of the information is displayed. In such a case, most of the outside light is directly delivered to the eyes, and the user visually recognizes an actual scene in front of the user as depicted in FIG. 3.

In the example of FIG. 3, the user is assumed to be in a bedroom of a house. Two beds are arranged side by side on a right side viewed from the user, and a chair and a table are disposed left back.

It is noted that the scene actually viewed by the user is a scene of a wide range as indicated by being surrounded by a broken line rectangle. A scene indicated by being surrounded by a frame F generally at a center of FIG. 3 is a scene of a range in which the HMD 1 can display information by superimposing the information on the scene, which is part of the scene in an overall visual field of the user.

In other words, a displayable range of the HMD 1 is a partial range of the user's overall visual field. Various kinds of information are displayed using the partial range. How the user views the scene in the displayable range of the HMD 1 will hereinafter be described.

Figure 4A:
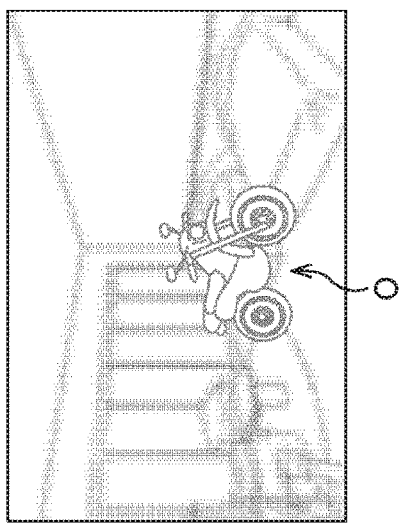
FIGS. 4A and 4B depict diagrams of another example of how the user views scenes.
Figure 4B:
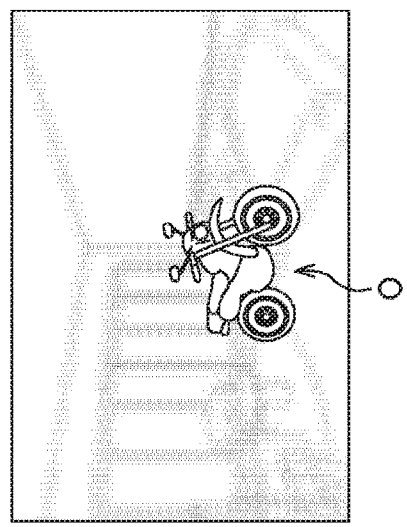

FIGS. 4A and 4B depict diagrams of another example of how the user views scenes.

FIG. 4A illustrates how the user views the scene in a case in which a motorcycle image is displayed as a virtual object O. The user visually recognizes an object displayed by the HMD 1 as a virtual object that is superimposed on objects actually present in front of the user. The virtual object O may be either a two-dimensional image or a three-dimensional image that can be viewed stereoscopically.

In the example of FIG. 4A, it is assumed that the transmittance is 50% and the display luminance is 50%.

A state in which lines indicating actually present surrounding objects (objects) such as the beds are depicted in a blurry state represents that the user sees the surrounding objects present in the bedroom via the light control element 14 having the transmittance kept low. In addition, a state in which a line indicating the virtual object O is depicted in a faint color represents that the display luminance is kept low.

FIG. 4B illustrates how the user views a scene in a state of setting the transmittance to 10% and the display luminance to 100%. A state in which the surrounding objects are depicted in a blurrier state than that of FIG. 4A represents that the transmittance in FIG. 4B is lower than that in FIG. 4A.

Such adjustment of the transmittance and the display luminance is made according to brightness of surroundings including a user's location. The surrounding brightness is determined on the basis of, for example, illuminance detected by an illuminance sensor provided in the HMD 1. Alternatively, the surrounding brightness may be determined on the basis of luminance of an image captured by a camera provided in the HMD 1.

FIG. 5 is a diagram depicting an example of setting the transmittance and the display luminance.

A horizontal axis of FIG. 5 represents the surrounding brightness, and a vertical axis thereof represents the visibility to the display content.

In a case, for example, in which the surrounding brightness is illuminance n1, a combination of the transmittance of 50% and the display luminance of 50% is used. In the case in which the surrounding brightness is the illuminance n1, information is displayed in the state as depicted in FIG. 4A.

It is noted that a maximum value of the transmittance is set to 50% because maximum transmittance of the light control element 14 itself is approximately 70% due to a restriction on a material and because transmittance of an emission-side reflection film of the light guide plate 12 is approximately 75%. Due to such restrictions, the maximum transmittance of the HMD 1 is, for example, 50%.

While the transmittance of the light control element 14 is described to be controlled as appropriate below, the overall transmittance of the HMD 1 is controlled through the control over the transmittance of the light control element 14.

Furthermore, in a case in which the surrounding brightness is illuminance n2, a combination of the transmittance of 20% and the display luminance of 40% is used. A transition from the state of using the combination of the transmittance of 50% and the display luminance of 50% to the state of using the combination of the transmittance of 20% and the display luminance of 40% and a reverse transition thereof occur when the surrounding brightness is equal to brightness that serves as a threshold. The transitions of the respective states will be described later in detail.

In a case in which the surrounding brightness is illuminance n3, a combination of the transmittance of 20% and the display luminance of 60% is used, and in a case in which the surrounding brightness is illuminance n4, a combination of the transmittance of 20% and the display luminance of 80% is used.

In a case in which the surrounding brightness is illuminance n5, a combination of the transmittance of 10% and the display luminance of 60% is used, and in a case in which the surrounding brightness is illuminance n6, a combination of the transmittance of 10% and the display luminance of 80% is used. In a case in which the surrounding brightness is illuminance n7, a combination of the transmittance of 10% and the display luminance of 100% is used.

The transmittance of the light control element 14 is adjusted stepwise in such a manner as to become lower as the surrounding brightness is higher.

Such information associated with the combinations of the transmittance and the display luminance is set to the HMD 1 in advance. The HMD 1 detects the surrounding brightness at, for example, predetermined intervals, and adjusts the transmittance and the display luminance of the display section 11 by using the combination according to each detected brightness.

The HMD 1 adjusts the transmittance and the display luminance using the combinations depicted in FIG. 5 only at normal times. At a hazard time such as when it suddenly grows dark, the transmittance and the display luminance are adjusted using setting different from setting at the normal times.

In a case, for example, in which the surrounding brightness falls to be equal to or lower than an amount of change set as the threshold, it is determined to be a hazard time, and hazard time information is displayed.

Example of Display of Hazard Time Information

FIG. 6 is a diagram depicting an example of display of hazard time information.

A state depicted in a left end of FIG. 6 is a normal time state. Various kinds of information are displayed using any of the combinations of the transmittance and the display luminance of FIG. 5. It is noted that none of the information is displayed in an example of the left end of FIG. 6.

It is noted herein that in a case of a sudden fall in the surrounding brightness due to occurrence of blackout or the like as pointed out by an open arrow #1, rendering is performed to highlight contours of the surrounding objects as pointed out by an open arrow #2. A display mode of the HMD 1 changes from a normal time display mode to a hazard time display mode, and information representing the contours of the surrounding objects is displayed as the hazard time information as an alternative to the information displayed previously.

In an example of a right end of FIG. 6, an image of a line representing the contour of each of the surrounding objects such as the beds, the chair, the table, and a window on a wall surface is displayed while being superimposed on a dark scene. An image of the line representing a contour including edges, sharp parts, and the like is displayed in a predetermined color.

In other words, at the normal times, the HMD 1 repeatedly recognizes the surrounding objects by not only detecting the surrounding brightness but also analyzing images captured by the camera and acquires information regarding feature points configuring the contours of the surrounding objects. The information regarding the feature points of the surrounding objects is repeatedly stored in the memory of the HMD 1 as environmental information. The feature points of the surrounding objects contain information regarding points, such as corners of treads of stairs, at which distances from the user suddenly change.

Furthermore, at the normal times, the HMD 1 repeatedly estimates a position and a posture of the user on the basis of the information regarding the feature points of the surrounding objects, an acceleration detected by an acceleration sensor, an angular speed detected by a gyro sensor, and the like.

It is noted that these pieces of processing are performed at the normal times and do not particularly increase a processing load and power consumption of processing for hazard time display.

In the case of the sudden fall in the surrounding brightness, information representing the contours of the surrounding objects is displayed as depicted in the right end of FIG. 6, on the basis of the information regarding the feature points of the surrounding objects and information representing a state of the user including the position and the posture of the user, which are pieces of information acquired in advance.

FIGS. 7A, 7B, and 7C depict diagrams of an example of setting the transmittance and the display luminance for use in displaying the hazard time information.

A horizontal axis of FIG. 7A represents a time. FIG. 7A represents a change in the surrounding illuminance, and FIG. 7B represents a change in the transmittance. FIG. 7C represents a change in the display luminance of the display section 11.

As depicted in FIG. 7A, in a case, for example, in which blackout occurs at a time t1 and the surrounding illuminance falls to be equal to or lower than the threshold, the transmittance is adjusted to the maximum transmittance as depicted in FIG. 7B. In addition, at a timing of the time t1, the information representing the contours of the surrounding objects starts to be displayed.

The transmittance is equal to the maximum transmittance after passage of a predetermined period of time from the time t1. A state of making the transmittance equal to the maximum transmittance continues for a predetermined period of time.

Furthermore, as depicted in C of FIG. 7C, the display luminance of the display section 11 is set equal to display luminance at and before the time t1, until a time t2, that is, a time right after the time t1. Right after the information starts to be displayed, the information representing the contours of the surrounding objects is displayed using the same display luminance as that used for the information displayed previously.

At and after the time t2, the display luminance is adjusted to gradually fall with the passage of time.

FIG. 8 is a diagram depicting an example of a change in the display luminance.

A horizontal axis of FIG. 8 represents the time, and a vertical axis thereof represents the display luminance.

As described above, the display luminance of the display section 11 gradually falls at and after the time t2, that is, the time right after the information representing the contours of the surrounding objects starts to be displayed. A broken line L11 of FIG. 8 represents the display luminance.

In addition, a solid line L1 represents user's dark adaptation characteristics. The dark adaptation is a change in visual sensation by which eyesight is gradually recovered with the passage of time in a case of a change in a surrounding environment from a bright environment to a dark environment.

The dark adaptation characteristics indicated by the solid line L1 represent a change in minimum light necessary for user's visually recognition over time. At each of the times, the user is able to visually recognize information displayed at a higher display luminance than the luminance indicated by the solid line L1 but is unable to visually recognize information displayed at a lower display luminance than that indicated by the solid line L1.

As depicted in FIG. 8, the display luminance for use in displaying the information representing the contours of the surrounding objects is always set to values at which the user going through the dark adaptation can visually recognize the information although the display luminance gradually falls.

The user can thereby visually recognize the information representing the contours of the surrounding objects even while it suddenly grows dark in the surroundings by blackout and the dark adaptation occurs to the user.

Figure 9:
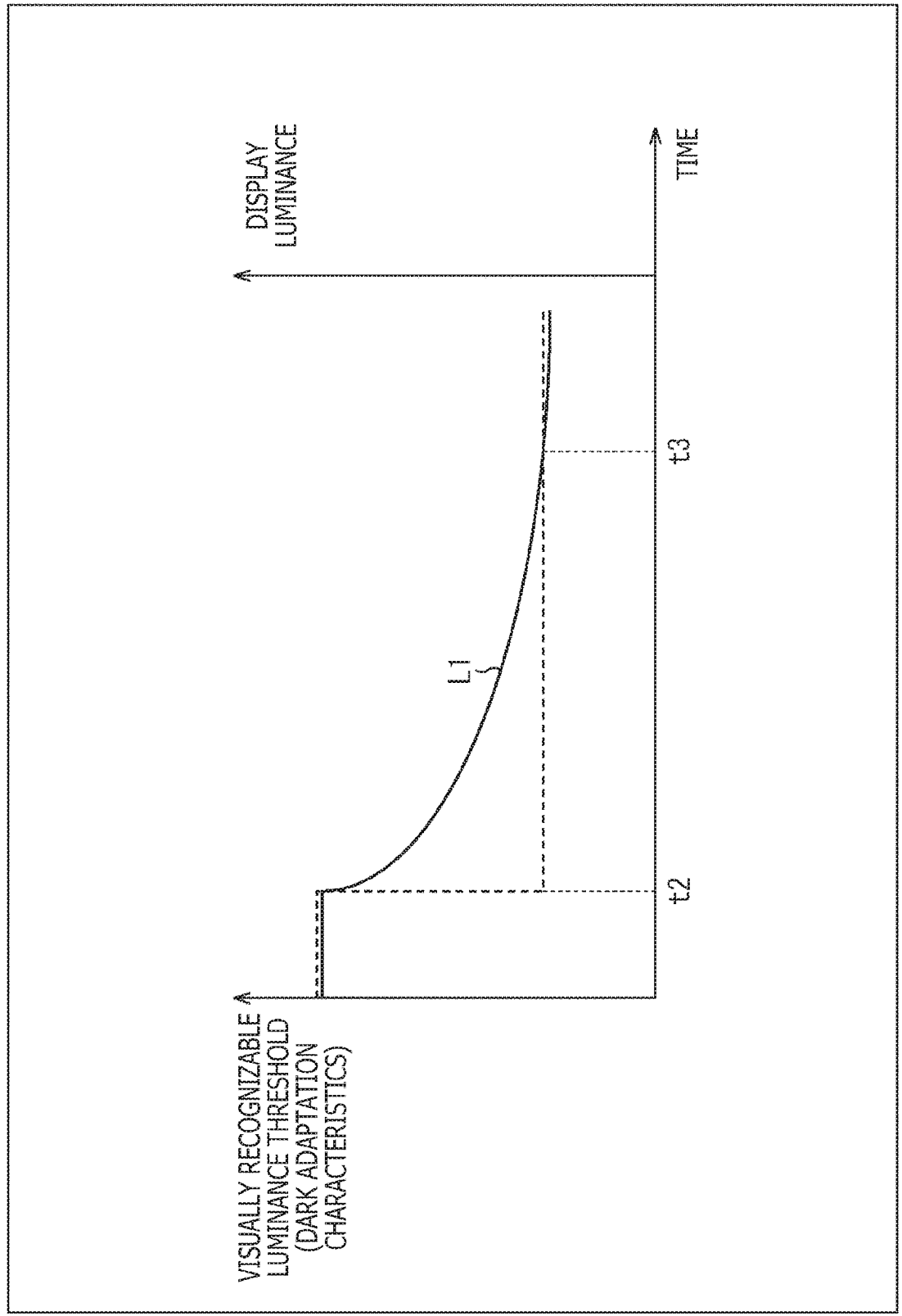
FIG. 9 is a diagram depicting another example of the change in the display luminance.

As indicated by a broken line of FIG. 9, for example, in a case of a sudden fall in the display luminance at a timing of the time t2, the user is unable to visually recognize the information representing the contours of the surrounding objects until a time t3 at which the display luminance exceeds the minimum luminance represented by the dark adaptation characteristics. Gradually lowering the display luminance as depicted in FIG. 8 makes it possible to prevent the user from being unable to visually recognize the information representing the contours of the surrounding objects until the user can visually recognize the dark environment.

The dark adaptation characteristics are set, for example, as characteristics of an ordinary person. As described later, the dark adaptation characteristics may be set according to user's attributes such as an age and an eyesight, and the display luminance may be adjusted according to the set dark adaptation characteristics.

In such a way, displaying the information representing the contours of the surrounding objects in the case of sudden darkness in the surroundings enables the user to grasp surrounding hazards such as corners of a piece of furniture.

Moreover, displaying the information representing the contours of the surrounding objects while gradually lowering the display luminance makes it possible to prevent the display of the information representing the contours of the surrounding objects from disturbing the dark adaptation. For example, the user can visually recognize the surrounding environment immediately even with the HMD 1 removed when time elapses to some extent.

FIG. 10 is a diagram depicting an example of how the user views a scene at a time of removing the HMD 1.

An upper portion of FIG. 10 illustrates how the user views a scene in a case of no change in the display luminance, and a lower portion thereof illustrates how the user views a scene in a case of changing the display luminance as described with reference to FIG. 8.

In a case of displaying the information representing the contours of the surrounding objects without changing the display luminance, then, information at a constant display luminance continues to be delivered to the user's eyes, and it is difficult for the dark adaptation to occur. Therefore, in the case in which the user removes the HMD 1 as pointed out by an open arrow #11, the surrounding environment possibly remains less visible to the user because of no dark adaptation.

As pointed out by an open arrow #21, the display luminance of the information representing the contours of the surrounding objects is kept low according to the dark adaptation characteristics; thus, it is possible to prevent the surrounding environment from remaining less visible to the user due to non-occurrence of such dark adaptation. In the case of removing the HMD 1, the dark adaptation occurs before removal, and the user can visually recognize the surrounding environment as pointed out by an open arrow #22.

The display luminance for use in displaying the information representing the contours of the surrounding objects may be changed not in a curved fashion (non-linearly) as depicted in FIG. 8 but in a straight line fashion (linearly). Furthermore, the display luminance may be changed not consecutively but stepwise.

Adjustment may be made not only of the display luminance but also of a color temperature.

Figure 11:
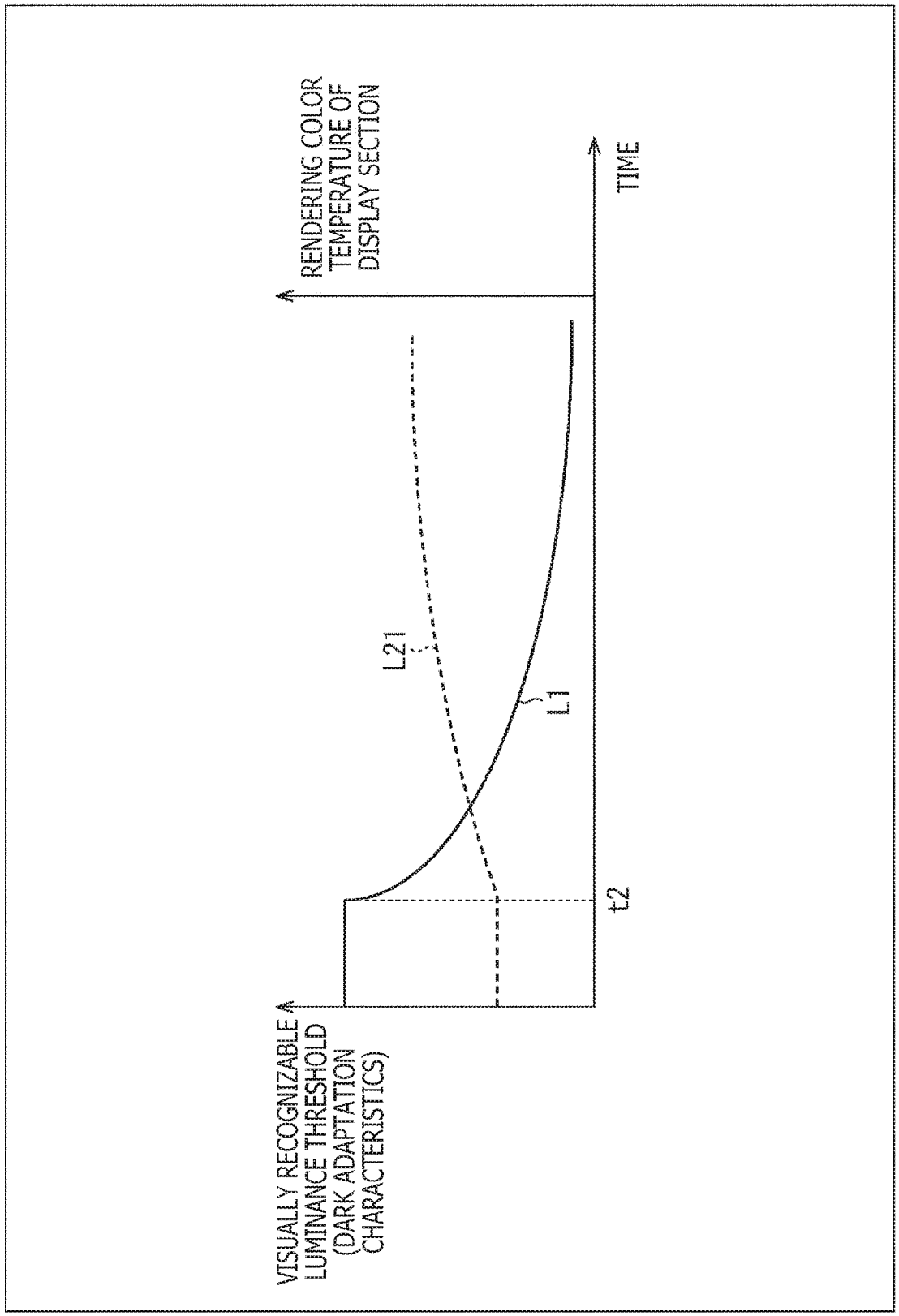
FIG. 11 is a diagram depicting an example of adjustment of a color temperature.

FIG. 11 is a diagram depicting an example of adjustment of the color temperature.

The color temperature is adjusted to gradually rise at and after the time t2, that is, the time right after the display of the information representing the contours of the surrounding objects starts. A broken line L21 of FIG. 11 represents a color temperature used by the display section 11 in rendering. The solid line L1 represents the user's dark adaptation characteristics.

As depicted in FIG. 11, it is possible to ensure visibility without disturbing user's dark adaptation by displaying the information representing the contours of the surrounding objects in a color at a low color temperature right after start of the display and gradually raising the color temperature with the passage of time. In a case of viewing an object in a color having a blueish component, that is, a color at a high color temperature right after it grows dark, the dark adaptation is disturbed by viewing the object in the color due to characteristics of human eyes, but it is possible to prevent such disturbance.

Processing performed by the HMD 1 for displaying the hazard time information as described above will be described later with reference to a flowchart.

<Configuration of HMD>

Figure 12:
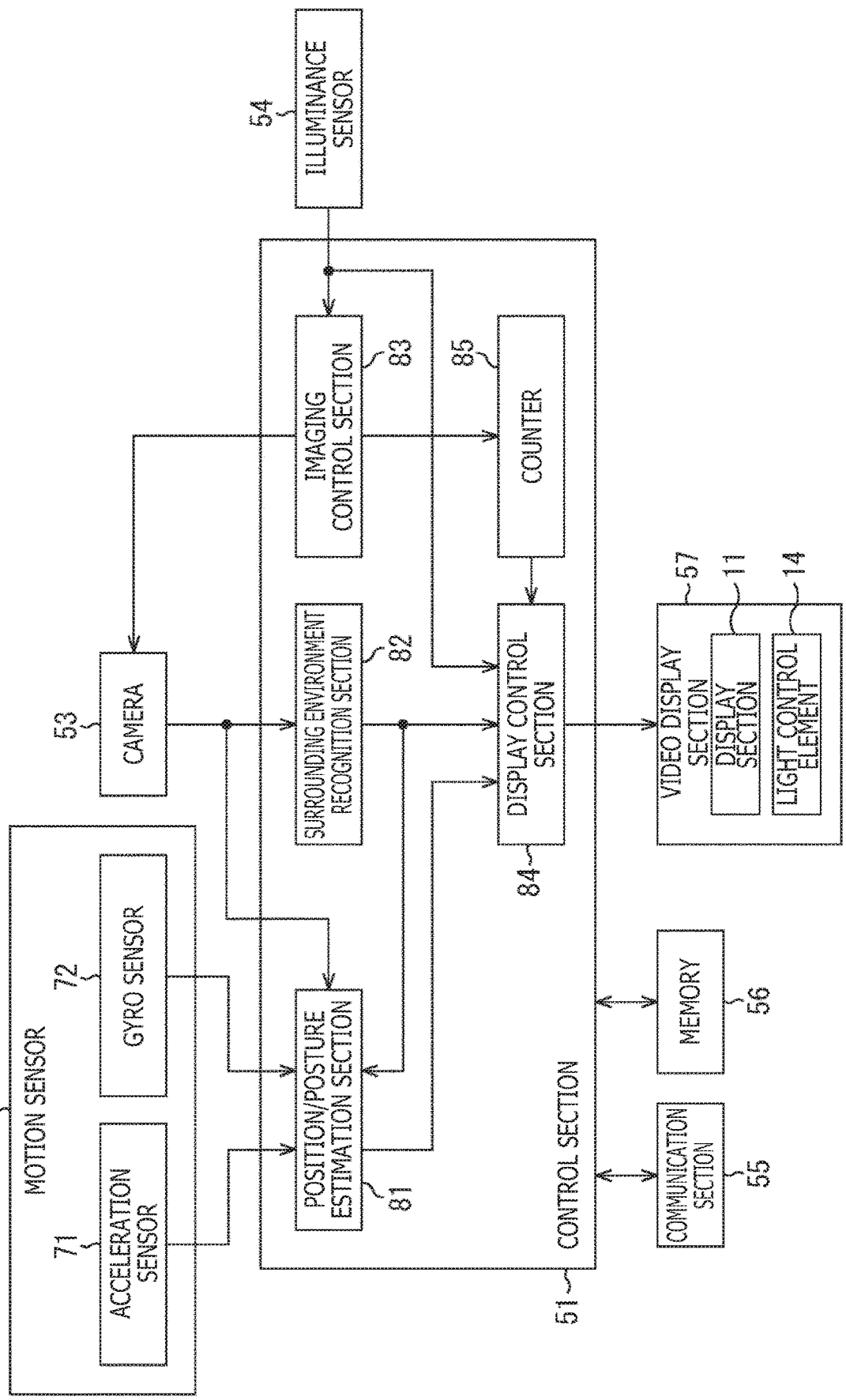
FIG. 12 is a block diagram depicting an example of configurations of the HMD.

FIG. 12 is a block diagram depicting an example of configurations of the HMD 1.

As depicted in FIG. 12, the HMD 1 is configured with a control section 51, a motion sensor 52, a camera 53, an illuminance sensor 54, a communication section 55, a memory 56, and a video display section 57. The motion sensor 52 is configured with an acceleration sensor 71 and a gyro sensor 72. The motion sensor 52, the camera 53, and the illuminance sensor 54 may be provided in an external apparatus such as a mobile terminal held by the user instead of being provided in the HMD 1.

The control section 51 is configured with a CPU (Central Processing Unit), a ROM (Read Only Memory), a RAM (Random Access Memory), and the like. The control section 51 executes programs stored in the ROM or the memory 56 and controls overall operations of the HMD 1. By executing predetermined programs, a position/posture estimation section 81, a surrounding environment recognition section 82, an imaging control section 83, a display control section 84, and a counter 85 are realized in the control section 51.

The position/posture estimation section 81 estimates a state of the user on the basis of images captured by the camera 53, an acceleration detected by the acceleration sensor 71, and an angular speed detected by the gyro sensor 72. To estimate the state of the user, the information regarding the feature points of the surrounding objects recognized by the surrounding environment recognition section 82 is also used as appropriate.

For example, information regarding a surrounding object at each position is prepared for the position/posture estimation section 81. The position/posture estimation section 81 estimates the position of the user on the basis of the surrounding objects recognized by the surrounding environment recognition section 82 and surrounding objects in the images captured by the camera 53.

Furthermore, information associated with an acceleration and an angular speed for each user's posture is prepared for the position/posture estimation section 81. The position/posture estimation section 81 estimates the posture of the user on the basis of the acceleration detected by the acceleration sensor 71 and the angular speed detected by the gyro sensor 72.

In such a way, the state of the user estimated by the position/posture estimation section 81 includes at least one of the position of the user or the posture of the user. Information representing a result of estimation of the position and the posture is supplied to the display control section 84.

The surrounding environment recognition section 82 recognizes positions, forms, feature points, and the like of objects (surrounding objects) actually present in the surroundings by analyzing the images captured by the camera 53. The surrounding environment recognition section 82 also recognizes distances to the surrounding objects, heights at which the surrounding objects are placed, types of the surrounding objects, and the like as appropriate. Information for use in recognizing each of these details is prepared for the surrounding environment recognition section 82. The surrounding environment recognition section 82 functions as an acquisition section that acquires environmental information which is information associated with a surrounding physical environment.

The surrounding environment recognition section 82 outputs the environmental information including information associated with at least any of the positions, the forms, the feature points, the distances, the heights, or the types of the surrounding objects to the display control section 84. The positions of the surrounding objects represent, for example, relative positions of the surrounding objects with reference to a position of the HMD and are acquired on the basis of the captured images. A communication instrument such as a beacon may be installed at each surrounding object in advance, and the position of the surrounding object may be acquired by the HMD on the basis of a signal from the communication instrument. The information regarding the feature points of the surrounding objects included in the environmental information output from the surrounding environment recognition section 82 is also supplied to the position/posture estimation section 81 and used in estimating the position and the posture of the user as appropriate.

The imaging control section 83 controls the camera 53 in such a manner as to repeatedly image the scene in front of the user.

Furthermore, in a case of detecting that it has suddenly grown dark in the surroundings on the basis of data supplied from the illuminance sensor 54, the imaging control section 83 controls an imaging element of the camera 53 in such a manner as to increase a gain and prolong exposure time. Changing setting of the imaging element makes it possible to continue capturing appropriate images for use in recognizing the surrounding environment even when it has suddenly grown dark in the surroundings.

The display control section 84 controls the display section 11 and the light control element 14 in the video display section 57 in such a manner as to display various kinds of information such as images and text. Information representing combinations of the transmittance and the display luminance described with reference to FIG. 5 is prepared for the display control section 84. Display under control of the display control section 84 is performed on the basis of data transmitted from, for example, the external apparatus and received by the communication section 55 or data read out from the memory 56.

Furthermore, in the case of detecting that it has suddenly grown dark in the surroundings on the basis of the data supplied from the illuminance sensor 54, the display control section 84 sets the display mode to the hazard time display mode to start displaying the hazard time information. After start of display of the hazard time information, the display control section 84 controls the display of the hazard time information by adjusting the display luminance and adjusting the color temperature with the passage of time represented by count values supplied from the counter 85.

The counter 85 outputs the count values representing a time lapse to the display control section 84.

The acceleration sensor 71 in the motion sensor 52 detects an acceleration of the HMD 1 and outputs information regarding the detected acceleration to the position/posture estimation section 81.

The gyro sensor 72 detects an angular speed of the HMD 1 and outputs information regarding the detected angular speed to the position/posture estimation section 81.

The camera 53 is provided, for example, at a predetermined position on a front surface of the HMD 1 and images the scene in front of the user. The camera 53 outputs images obtained by imaging the scene to the position/posture estimation section 81 and the surrounding environment recognition section 82.

The illuminance sensor 54 detects illuminance and outputs information regarding the illuminance representing the surrounding brightness to the imaging control section 83 and the display control section 84.

The communication section 55 is a communication module such as a wireless LAN or Bluetooth (registered trademark). The communication section 55 communicates with the external apparatus such as the mobile terminal held by the user or the content delivery server 2. Information to be presented to the user is acquired by communication through the communication section 55.

The memory 56 is a storage medium such as a flash memory. Various kinds of data such as programs executed by the CPU of the control section 51 and the information to be presented to the user are stored in the memory 56.

The video display section 57 is configured with the display section 11 and the light control element 14. The video display section 57 operates under control of the display control section 84 and delivers video light of predetermined information together with outside light to the user's eyes via the respective sections in the right eye optical system 1R and the left eye optical system 1L.

It is noted that buttons operated by the user, a speaker that outputs a sound, a microphone that detects a user's voice, and the like are also provided in the HMD 1.

<Operations of HMD>

Display processing by the HMD 1 configured as described above will now be described with reference to a flowchart of FIG. 13.

In Step S1, display control processing is performed. The display control processing performed in Step S1 is processing at normal times at which a change in the surrounding brightness is small. Details of the display control processing will be described later. The display control processing enables the predetermined information to be displayed in the state described with reference to FIGS. 4A and 4B.

In Step S2, the surrounding environment recognition section 82 recognizes the positions, the forms, the feature points, and the like of the surrounding objects by analyzing the images captured by the camera 53. The environmental information including a recognition result is supplied to the display control section 84.

In Step S3, the position/posture estimation section 81 estimates the position and the posture of the user on the basis of the images captured by the camera 53, the acceleration detected by the acceleration sensor 71, and the angular speed detected by the gyro sensor 72. Information representing a result of estimation of the position and the posture is supplied to the display control section 84.

In Step S4, the illuminance sensor 54 detects the surrounding illuminance. The information representing the surrounding illuminance is supplied to the display control section 84.

Recognition processing performed by the surrounding environment recognition section 82 on the positions, the forms, the feature points, and the like of the surrounding objects, estimation processing performed by the position/posture estimation section 81 on the position and the posture of the user, and detection processing performed by the illuminance sensor 54 on the surrounding illuminance are repeatedly performed.

In Step S5, the display control section 84 determines whether or not the surrounding illuminance falls by a certain value or greater. In a case of determining in Step S5 that the surrounding illuminance falls by the certain value or greater, the processing goes to Step S6.

In Step S6, the hazard time information display processing is performed. As described above, the hazard time information display processing is processing for ending display of the information displayed previously and displaying the hazard time information. Details of the hazard time information display processing will be described later with reference to a flowchart of FIG. 14.

After the hazard time information display processing is performed or in a case in which it is determined in Step S5 that the surrounding illuminance does not fall by the certain value or greater, the processing returns to Step S1 and a series of processing described above is repeatedly performed.

Figure 13:
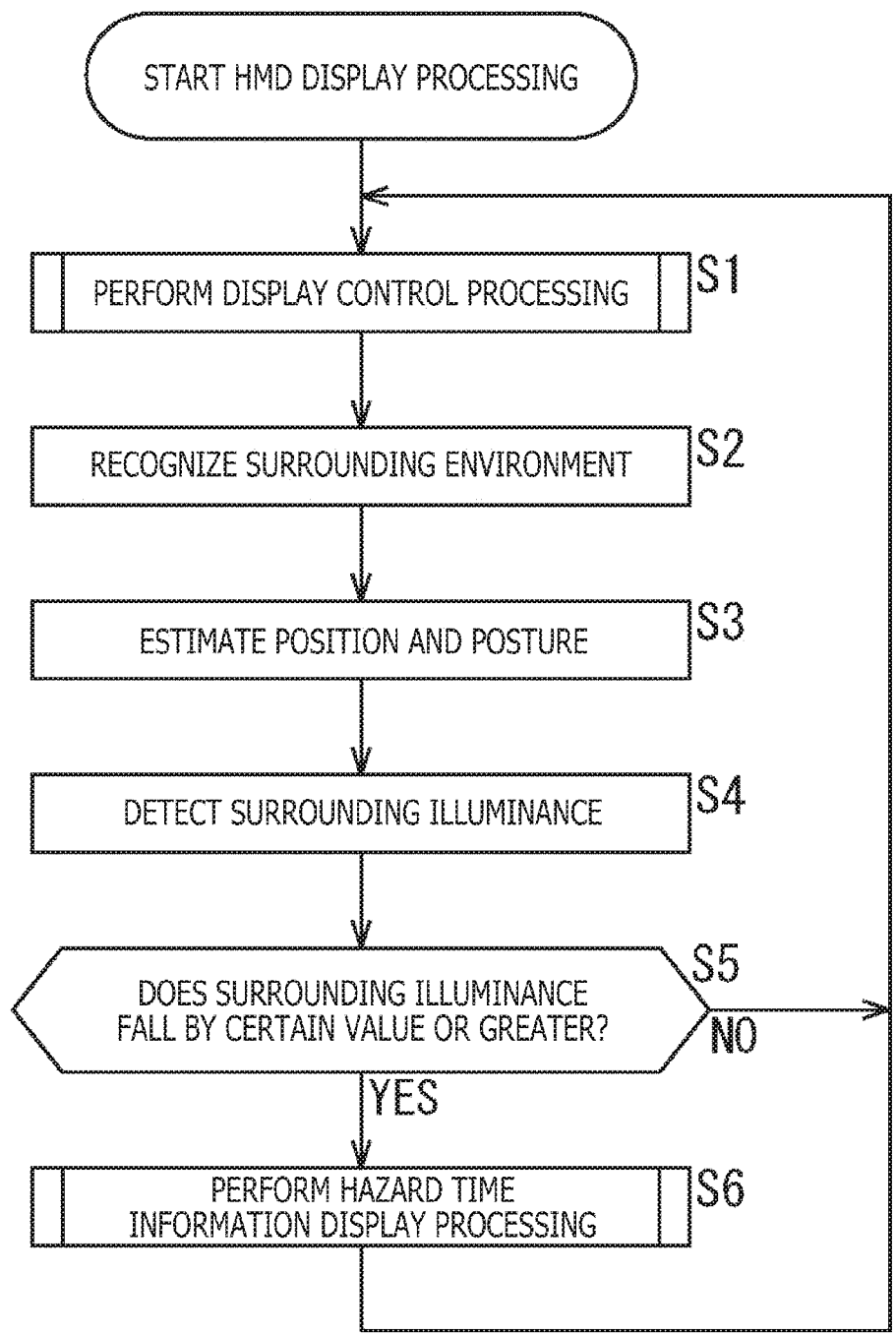
FIG. 13 is a flowchart illustrating HMD display processing.

In a case, for example, in which the user gives an instruction on an end of display of the various kinds of information or in which it is detected that the user removes the HMD 1, the processing of FIG. 13 is ended.

Next, the hazard time information display processing performed in Step S6 of FIG. 13 will be described with reference to the flowchart of FIG. 14.

In Step S11, the display control section 84 controls the light control element 14 in such a manner that the transmittance is set to the maximum transmittance.

In Step S12, the display control section 84 renders the information representing the contours of the surrounding objects recognized by the surrounding environment recognition section 82. An image of a line representing a contour of each surrounding object is displayed, for example, at a position at which the contour overlaps a contour of an actually present surrounding object according to the position and the posture of the user estimated by the position/posture estimation section 81.

In Step S13, the display control section 84 determines whether or not a certain period of time has elapsed, on the basis of the count values measured by the counter 85.

In a case of determining in Step S13 that the certain period of time has elapsed, the display control section 84 lowers the display luminance, raises the color temperature, and continues rendering the information representing the contours in Step S14.

After the display luminance and the color temperature are adjusted in Step S14 or in a case of determining in Step S13 that the certain period of time has not elapsed in Step S13, the display control section 84 determines whether or not the surrounding illuminance is equal to or higher than the certain value in Step S15.

In a case of determining in Step S15 that the surrounding illuminance is not equal to or higher than the certain value, the processing returns to Step S12, in which the information representing the contours of the surrounding objects is continuously displayed.

In a case of determining in Step S15 that the surrounding illuminance is equal to or higher than the certain value by resolving the blackout, the processing returns to Step S6 of FIG. 13, and the subsequent processing is performed.

Through a series of processing described above, the user is allowed to visually recognize the surrounding environment promptly even in the case in which the blackout or the like occurs and it suddenly grows dark in the surroundings. Furthermore, controlling the display luminance and the color temperature according to the dark adaptation characteristics makes it possible to ensure the visibility of displayed objects without disturbing user's dark adaptation.

While it is described above that the information representing the contours of the surrounding objects is displayed as the hazard time information, various kinds of information representing the forms of the surrounding objects, such as information representing front surfaces of the surrounding objects and information representing the feature points of the surrounding objects, may be displayed. The lines representing the contours of the surrounding objects also belong to the information representing the forms of the surrounding objects. The form information representing the forms of the surrounding objects includes information regarding various colors, various forms, and various patterns such as the lines representing the contours of the surrounding objects, lines and colors representing the front surfaces of the surrounding objects, and marks representing the feature points of the surrounding objects.

Modifications

Example 1 of Display of Hazard Time Information

Not only the information representing the contours of the surrounding objects present in the real space but also information that is not visually recognizable in the dark but necessary at the hazard time may be displayed at the time of a sudden fall in the illuminance by recognizing the information in advance. Examples of the information necessary at the hazard time include an exit of each room, stairs, an evacuation route to a wide-area evacuation site or the like, and a place to put a flashlight in.

As a method of recognizing the information necessary at the hazard time, there is an object recognition method based on the images captured by the camera 53. There is also a recognition method including providing map information to the HMD 1 in advance and recognizing the information necessary at the hazard time according to a position measured by a GPS (Global Positioning System).

Example 2 of Display of Hazard Time Information

Not only the information representing the contours but also information representing shapes of the overall surrounding objects may be displayed. At this time, the contours are, for example, highlighted. For highlighting, any of various methods including, for example, changing gray levels, changing display colors, changing thicknesses, blinking, and using a broken line or a wavy line as the type of the lines is used.

In a case in which luminosity factor information regarding the user is provided in advance, contour highlighting may be performed by changing a display method depending on the user's luminosity factor information. For example, in a case in which the user is low in the visibility to colors in a low wavelength range, a color in a high wavelength range is used in highlighting the contours.

Example 3 of Display of Hazard Time Information

Figure 15:
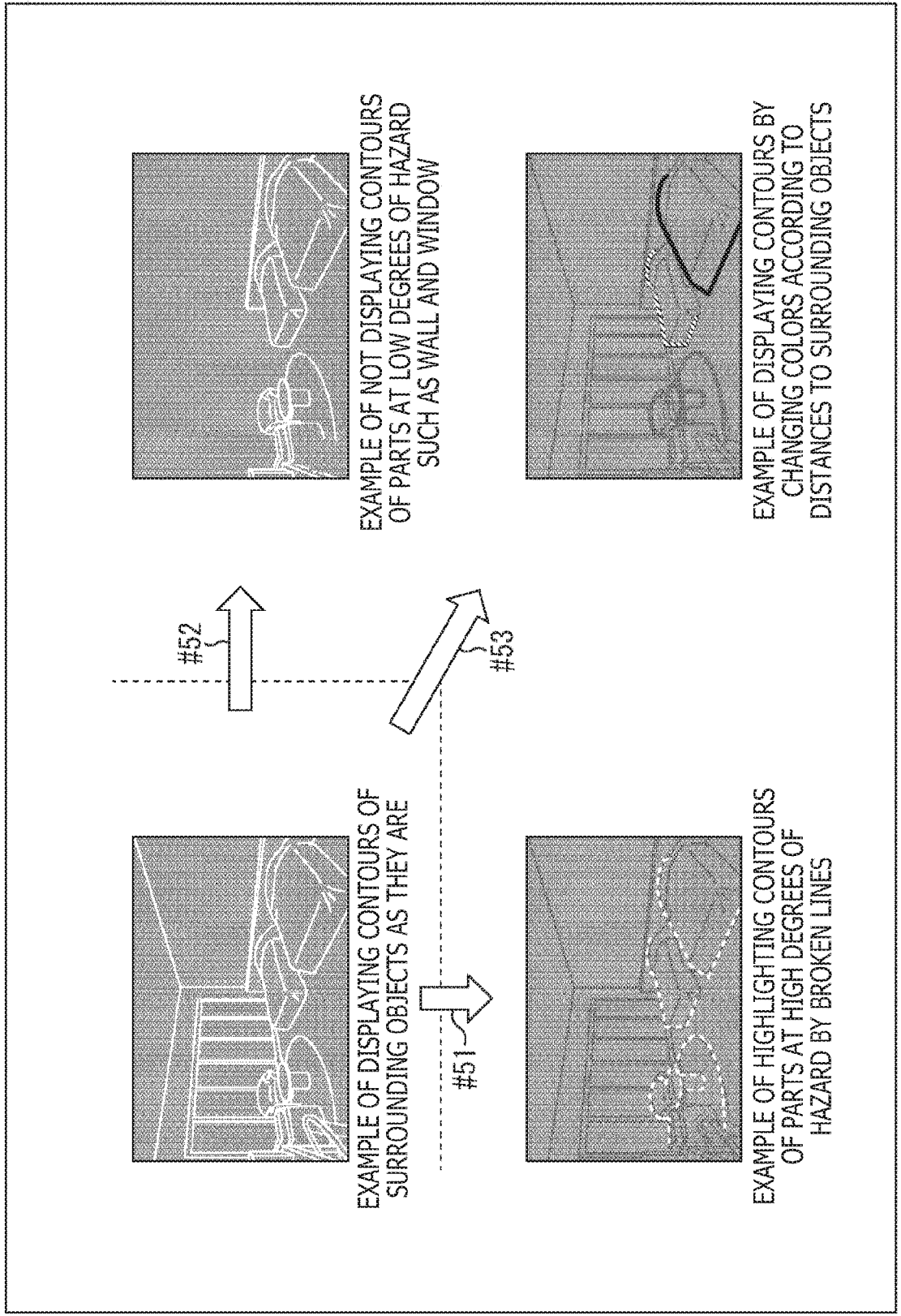
FIG. 15 is a diagram depicting an example of highlighting the hazard time information.

FIG. 15 is a diagram depicting an example of highlighting the hazard time information.

An upper left state depicted in FIG. 15 is a state of displaying the contours of the surrounding objects as they are. In an upper left example of FIG. 15, images of the lines representing the contours of the surrounding objects are displayed while being superimposed on a dark scene.

As pointed out by an open arrow #51, lines representing contours of parts at high degrees of hazard such as the beds, the chair, and the table may be highlighted by broken lines among the lines representing the contours of the surrounding objects.

As pointed out by an open arrow #52, images of lines representing the contours of parts at low degrees of hazard such as the wall and the window may be set hidden.

As pointed out by an open arrow #53, lines representing the contours may be displayed in a color-coded fashion according to distances to the surrounding objects. In such a case, for example, the line representing the contour of the bed at a closest position is displayed in a most eye-catching color, and the lines representing the contours of the chair and the table at second closest position are displayed in a second most eye-catching color.

Example 4 of Display of Hazard Time Information

Figure 16:
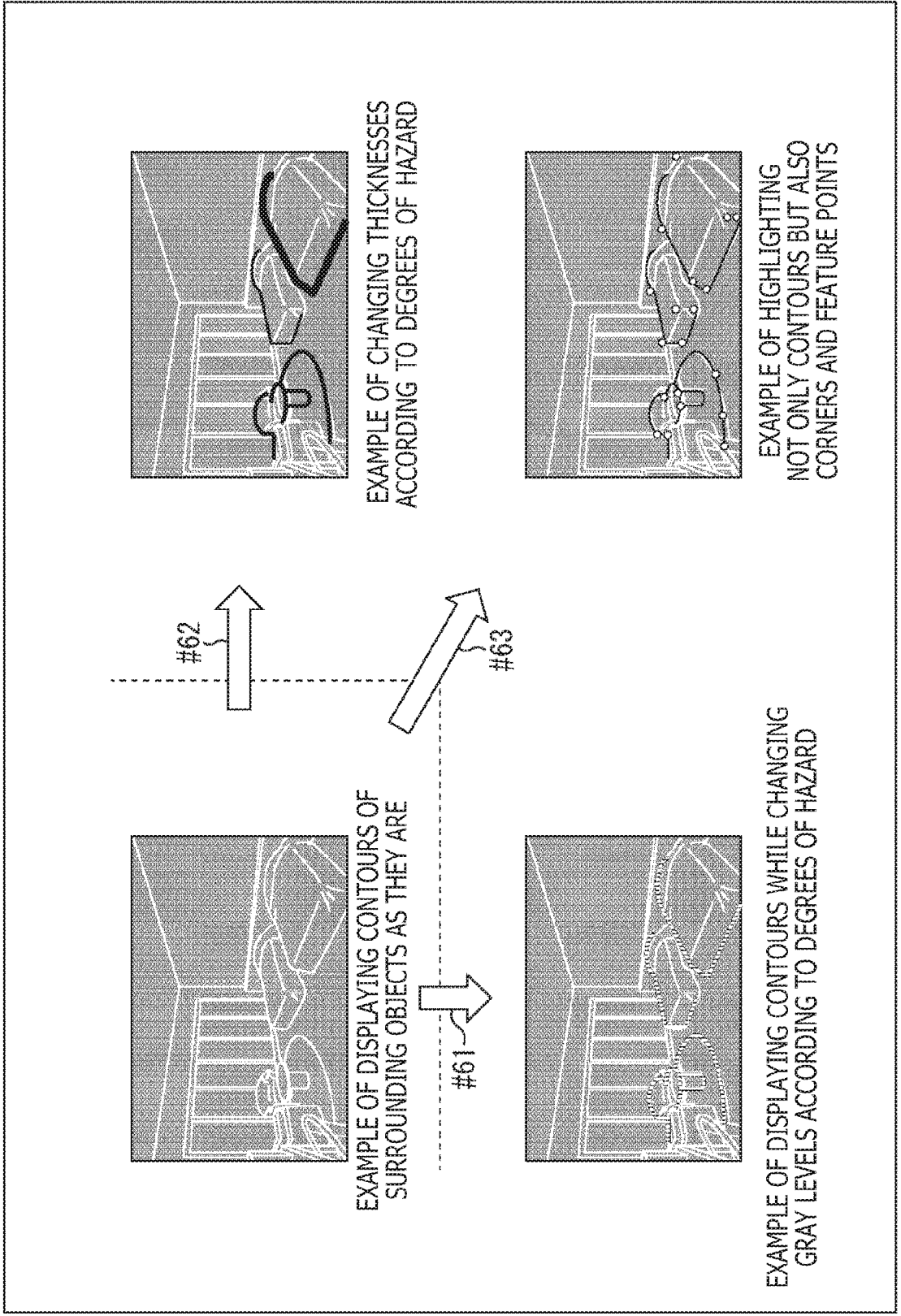
FIG. 16 is a diagram depicting another example of highlighting the hazard time information.

FIG. 16 is a diagram depicting another example of highlighting the hazard time information.

An upper left state depicted in FIG. 16 is a state of displaying the contours of the surrounding objects as they are.

As pointed out by an open arrow #61, the lines representing the contours of the surrounding objects may be displayed while changing gray levels according to degrees of hazard.

As pointed out by an open arrow #62, the lines representing the contours of the surrounding objects may be displayed while changing thicknesses according to the degrees of hazard.

As pointed out by an open arrow #63, not only the lines representing the contours but also the corners and feature points may be highlighted. The corners and the feature points are highlighted using, for example, eye-catching colors, eye-catching forms, or blinking. Each of the feature points is a part having greater changes in the luminance and the form than those of surrounding parts, and identified by, for example, analyzing captured images.

In such a way, the lines representing the contours are displayed by a combination of elements including a type of line, a color, a gray level, and a thickness as appropriate.

Example 5 of Display of Hazard Time Information

In a case in which the surrounding illuminance rises only momentarily in the dark environment, the display luminance is adjusted to rise once and then gradually fall.

FIGS. 17A, 17B, and 17C depict diagrams of an example of setting the display luminance.

FIG. 17A represents a change in the surrounding illuminance, and FIG. 17B represents the luminance easier for the user to visually recognize. FIG. 17C represents the display luminance.

In a case in which it momentarily grows bright at a time t11 as depicted in FIG. 17A, for example, by causing light from headlights of a motor vehicle running nearby to enter the user's eyes in a state in which the user is walking on a dark road at night, the user is dazzled, and it is difficult for the user to visually recognize any luminance as depicted in FIG. 17B. Subsequently, the visually recognizable luminance temporarily rises, and the user turns into a state in which it is difficult for the user to visually recognize the surroundings until the dark adaptation occurs again.

As depicted in FIG. 17C, exercising control in such a manner as to raise the display luminance of the contours of the surrounding objects once right after the time t1 and to gradually lower the display luminance makes it possible to continuously display the contours of the surrounding objects without disturbing the dark adaptation that occurs again.

In such a way, the hazard time information may be displayed at a timing other than the timing of the sudden fall in the surrounding brightness.

Example 6 of Display of Hazard Time Information

The contours of the surrounding objects may not necessarily be displayed. For example, it is less likely that a surrounding object at a higher position than a user's height, such as a ceiling or an illumination lamp installed on the ceiling, runs against the user even when the user moves. A line representing the contour of the surrounding object at such a high position may be hidden.

Example 7 of Display of Hazard Time Information

It is considered that, in a case of a low intensity of the outside light, a user's moving speed falls. By not displaying the lines representing the contours of the distant surrounding objects but displaying the lines representing the contours of only the nearby surrounding objects, it is possible to reduce hazards during movement.

Furthermore, attention may be called by not displaying the lines representing the contours of the surrounding objects such as large furniture and pillars at fixed positions but displaying the lines representing the contours of only the surrounding objects such as a bookshelf and a roll-round shelf possibly moved at a time of an earthquake. Whether or not the position of the surrounding object possibly changes is identified on the basis of images captured by the camera 53 at the time of recognizing the surrounding environment.

In such a way, the display of the hazard time information is controlled according to the types of the surrounding objects as objects. The types of the surrounding objects include a type of size such as large/small size, a type of height such as high/low, a type of weight such as heavy/light, a type according to a way of installation such as movable/fixed, a type of material, and the like.

Example 8 of Display of Hazard Time Information

Information regarding a surrounding object that is not at a position at which surrounding objects can be displayed by being superimposed on the scene in the real space may be displayed as hazard time information. For example, information regarding a direction of the evacuation route and information regarding a direction of fire catching at a time of a fire may be displayed on the basis of information regarding the surrounding objects located out of the displayable range (range of the frame F of FIG. 3) of the display section 11 and located in a range in which the camera 53 can image the scene. Moreover, those pieces of information may be notified by audio using the speaker.

Example 9 of Display of Hazard Time Information

In the case in which the user can visually recognize the surrounding environment, only information that is not directly visually recognizable such as the route to the wide-area evacuation site and information out of the user's visual field may be displayed without displaying the contours of the surrounding objects. Information regarding a dark adaptation speed and information associated with user's attributes such as the age and the eyesight are input in advance, and it may be determined whether or not the user can visually recognize the surrounding environment using those pieces of information.

Example of Recognition of Environment

In a case of a fall in the outside light to such an extent that even the imaging element of the camera 53 is incapable of detection, acquisition of the information regarding the surrounding objects by use of the camera 53 may be stopped. In such a case, the information regarding the surrounding objects is updated by updating the last acquired information regarding the surrounding objects by use of a result of estimation of a user's motion state by the acceleration sensor 71 and the gyro sensor 72.

Furthermore, information may be presented by a combination of information acquired on the basis of images captured by the camera 53 including the gain-increased imaging element and the already-acquired information regarding the surrounding objects.

For example, information associated with an object such as a piece of furniture that is hidden in the shadow and that is unrecognizable from the images captured by the camera 53 may be displayed. Displaying the information regarding the surrounding object in a location invisible to the user on the basis of the already-acquired information enables the user to avoid running against the surrounding object located behind even while the user is moving.

Example 10 of Display of Hazard Time Information

Information regarding the surrounding object that the user is unable to directly visually recognize may be displayed as the hazard time information. For example, by displaying information regarding an object hidden behind a nearby object, the user can avoid running against the object behind the nearby object at a time of stepping over or sidestepping the nearby object.

Example 11 of Display of Hazard Time Information

A degree of hazard representing an extent of hazards of a user in the dark environment may be calculated, and the display of the hazard time information may be controlled according to the calculated degree of hazard. The degree of hazard is obtained on the basis of, for example, the state of the user such as the position and the posture and the surrounding environment represented by the environmental information.

Furthermore, the hazard time information may be displayed by changing display colors or gray levels for portions such as stairs to which a vertical movement occurs or according to the extent of hazard based on the distances between the user and the surrounding objects. It is thereby possible to encourage the moving user to avoid stumbling or urge the user to take precautions against a nearby object.

FIG. 18 is a diagram depicting an example of evaluation values for use in evaluating the degree of hazard.

A table depicted in FIG. 18 is a table indicating evaluation values associated with respective situations including "user's posture," "user's moving speed," "irregularities of the surrounding object," and "user's position (distance to the surrounding object)." The evaluation values are represented in three levels of "0," "1," and "2," and a higher numerical value indicates a higher degree of hazard.

As indicated as the evaluation value for "user's posture," "0" is set as the evaluation value in a case in which the user is seated, and "1" is set as the evaluation value in a case in which the user stands still. In addition, "2" is set as the evaluation value in a case in which the user is moving.

As indicated as the evaluation value for "user's moving speed," "0" is set as the evaluation value in a case in which the user is moving at a speed lower than 1 km/h, and "1" is set as the evaluation value in a case in which the user is moving at a speed equal to or higher than 1 km/h and equal to or lower than 3 km/h. In addition, "2" is set as the evaluation value in a case in which the user is moving at a speed higher than 3 km/h.

As indicated as the evaluation value for "irregularities of the surrounding object," "0" is set as the evaluation value in a case in which irregularities of the surrounding object are smaller than 10 cm, and "1" is set as the evaluation value in a case in which the irregularities are equal to or greater than 10 cm.

As indicated as the evaluation value for "user's position," "0" is set as the evaluation value in a case in which the distance to the surrounding object is greater than 2 m, and "1" is set as the evaluation value in a case in which the distance is equal to or greater than 1 m and equal to or smaller than 2 m. "2" is set as the evaluation value in a case in which the distance to the surrounding object is smaller than 1 m.

In such a way, the evaluation values for use in evaluating the degree of hazard are set according to the situations.

The degree of hazard of each surrounding object is obtained, for example, as a total value of the evaluation values. In a case, for example, in which the user is moving at a speed equal to or higher than 1 km/h and equal to or lower than 3 km/h and in which the surrounding object having irregularities equal to or greater than 10 cm on a surface thereof is at a distance equal to or greater than 1 m and equal to or smaller than 2 m, the degree of hazard of the surrounding object is obtained as "5."

FIG. 19 is a diagram depicting an example of display according to the degree of hazard.

In an example of FIG. 19, a type of line, presence/absence of a blinking line, a gray level, a color, a thickness, presence/absence of display of feature points, and presence/absence of blinking feature points are illustrated as items of a display method for the information representing the contour of each surrounding object.

In a case, for example, in which the degree of hazard is "0," the type of line is set as a solid line, and the presence/absence of a blinking line is set as absent. In addition, the gray level is set as a half of a maximum value, and the color is set as green. The thickness is set as 1 pix (1 pixel), and the presence/absence of display of feature points is set as absent. The presence/absence of blinking feature points is set as absent.

Likewise, in a case in which the degree of hazard is "1 to 2" or "equal to or higher than 3," content of each item is set, and the information representing the contour of the surrounding object is displayed.

In such a way, the information representing the contour of the surrounding object is displayed in a more highlighted manner as the degree of hazard is higher.

Example of Output of Hazard Time Information

The hazard time information may be displayed using, as a trigger, detection of a wail of sirens by a microphone or detection of occurrence of a fire by a temperature sensor in addition to detection of the sudden change in the illuminance. Occurrence of a disaster may be detected on the basis of information transmitted from an external apparatus, and the hazard time information may be displayed using, as a trigger, detection of the occurrence of the disaster.

Example of Timing of Display

In a case in which an outside light intensity is equal to or higher than a certain value, the display of the hazard time information may be ended upon determining that a situation is back to a situation in which the user can visually recognize the surrounding environment.

Alternatively, the display of the hazard time information may be stopped at a timing at which a wearing detection proximity sensor mounted in the HMD 1 detects user's removal of the HMD 1.

The display of the hazard time information may be stopped at a timing instructed by the user or at a timing at which arrival of the user at the wide-area evacuation site is detected on the basis of position information measured by a GPS.

Example of Adjustment of Display Luminance

It is known that the dark adaptation speed varies with age. Specifically, in a case of an adult, it is known that the dark adaptation speed tends to fall as the adult gets older.

Information regarding a user's age may be set in advance. In such a case, a display luminance decline rate is adjusted depending on the dark adaptation characteristics according to the user's age. The dark adaptation characteristics may be set according to various user's attributes including not only the age but also the eyesight and a gender, and the display luminance may be adjusted according to the set dark adaptation characteristics.

The display luminance may be adjusted depending on characteristics according to the state of the user, for example, in such a manner that the characteristics are changed over between the case in which the user is standing still and the case in which the user is moving.

Example of Recognition of Environment

While it is described that the surrounding environment is recognized on the basis of the images captured by the camera 53, the surrounding environment may be recognized using another sensor.

The surrounding environment may be recognized using, for example, a ToF (Time of Flight) sensor that makes use of an infrared ray. Using the ToF sensor enables recognition of the surrounding environment even in such a dark environment that the camera 53 mounting the imaging element capable of detecting visible light is incapable of recognition.

Acquisition of Environmental Information

While it is described that the environmental information representing the surrounding environment is acquired on the basis of the images captured by the camera, the environmental information may be acquired from a server connected to the HMD 1 via the network. In a case, for example, in which model number information regarding a sofa present as a surrounding object is acquired, information regarding a form of the sofa may be acquired from the server on the basis of the model number information. The model number information regarding the sofa may be acquired by, for example, communicating with an apparatus incorporated into the sofa or may be identified on the basis of position information of the HMD 1.

Second Embodiment: Example of Case of Gentle Change in Surrounding Brightness

At the normal times other than the hazard time at which the hazard time information is displayed, various kinds of information are displayed using the combinations of the transmittance and the display luminance described with reference to FIG. 5.

Example of Setting Transmittance and Display Luminance

Figure 20:
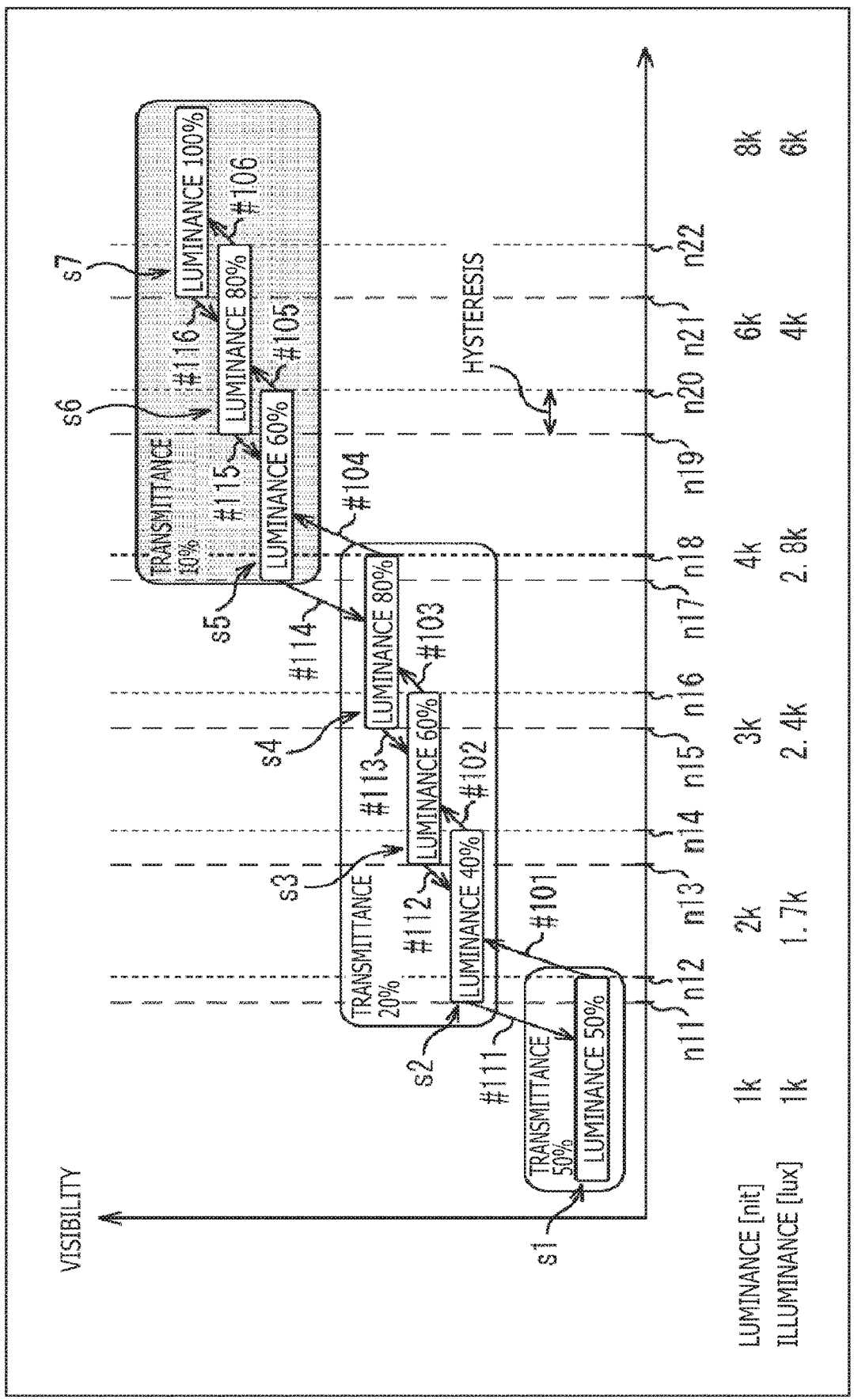
FIG. 20 is a diagram depicting an example of setting transmittance and display luminance.

FIG. 20 is a diagram depicting an example of setting the transmittance and the display luminance.

Combinations of the transmittance and the display luminance depicted in FIG. 20 are similar to the combinations described with reference to FIG. 5. Description overlapping that of FIG. 5 will be omitted as appropriate. A horizontal axis of FIG. 20 represents the surrounding brightness and a vertical axis thereof represents the visibility to the display content. The surrounding brightness is represented by luminance or illuminance.

As described above, the transmittance is set in three levels of 10%, 20%, and 50%. On the other hand, the display luminance used in the combination with the transmittance is set in five levels of 40%, 50%, 60%, 80%, and 100%. The transmittance is adjusted by the smaller number of levels than the number of levels of the display luminance.

Seven types of combinations are set using the transmittance and the display luminance.

As depicted in order from the left in FIG. 20, a state s1 is a state using a combination of the transmittance of 50% and the display luminance of 50%.

States s2 to s4 are states using combinations of the transmittance of 20% and the display luminance of 40%, 60%, and 80%. In the states s2 to s4, the outside light delivered to the user's eyes is kept lower since the lower transmittance than that used in the state s1 is set.

States s5 to s7 are states using combinations of the transmittance of 10% and the display luminance of 60%, 80%, and 100%. In the states s5 to s7, the outside light delivered to the user's eyes is kept lower since the lower transmittance than that used in the states s2 to s4 is set.

The display luminance is adjusted by adjusting a Duty cycle of a pulse representing a display period of the display section 11 (display device 21). The display control section 84 of FIG. 12 adjusts the display luminance of the display section 11 by outputting a control signal configured from a pulse having a predetermined Duty cycle. The Duty cycle of the pulse configuring the control signal corresponds to the display luminance of the display section 11.

In a case, for example, in which a control signal configured from a pulse having a Duty cycle of 50% is output from the display control section 84, the display luminance of the display section 11 is set to 50%. Furthermore, in a case in which a control signal configured from a pulse having a Duty cycle of 100% is output from the display control section 84, the display luminance of the display section 11 is set to 100%.

When the transmittance falls by one level, the Duty cycle is set lower than the previous Duty cycle, that is, the display luminance is set lower. This is because the outside light restricted by the light control element 14 is further restricted and an amount of light incident on the user's eyes is reduced when the transmittance falls by one level, and it is therefore preferable to lower the image display luminance. Exercising such control makes it possible to suppress deterioration of the display device 21.

As indicated as an arrow #101 of FIG. 20, a transition from the state s1 to the state s2 occurs when the surrounding brightness changes to brightness n12 in a state in which the surrounding brightness is lower than the brightness n12. On the other hand, a transition from the state s2 to the state s1 indicated as an arrow #111 occurs when the surrounding brightness changes to brightness n11 in a state in which the surrounding brightness is higher than the brightness n11.

The brightness n12 at which the transition from the state s1 to the state s2 occurs is set to a higher value than that of the brightness n11 at which the transition from the state s2 to the state s1 occurs.

Furthermore, as indicated as an arrow #102, a transition from the state s2 to the state s3 occurs when the surrounding brightness changes to brightness n14 in a state in which the surrounding brightness is lower than the brightness n14. On the other hand, a transition from the state s3 to the state s2 indicated as an arrow #112 occurs when the surrounding brightness changes to brightness n13 in a state in which the surrounding brightness is higher than the brightness n13.

The brightness n14 at which the transition from the state s2 to the state s3 occurs is set to a higher value than that of the brightness n13 at which the transition from the state s3 to the state s2 occurs.

Transitions between the other states occur similarly. For example, as indicated as an arrow #106, a transition from the state s6 to the state s7 occurs when the surrounding brightness changes to brightness n22 in a state in which the surrounding brightness is lower than the brightness n22. On the other hand, a transition from the state s7 to the state s6 indicated as an arrow #116 occurs when the surrounding brightness changes to brightness n21 in a state in which the surrounding brightness is higher than the brightness n21.

The brightness n22 at which the transition from the state s6 to the state s7 occurs is set to a higher value than that of the brightness n21 at which the transition from the state s7 to the state s6 occurs.

In such a way, hysteresis characteristics are set as indicated by a two-way arrow of FIG. 20 in adjustment of the transmittance.

Adjusting the transmittance in a manner in which the hysteresis characteristics are given makes it possible to prevent the user from feeling uncomfortable due to a frequent change in the transmittance with a small change in the illuminance.

In other words, by setting a threshold for raising the transmittance at a time of a change from a bright state to a dark state so as to be different from a threshold for lowering the transmittance at a time of a change from the dark state to the bright state, it is possible to prevent the frequent change in the transmittance.

The hysteresis characteristics are set not only in the adjustment of the transmittance but also in the adjustment of the display luminance. It is thereby possible to adjust the display luminance in a more natural way according to a change in the outside light.

Figure 21:
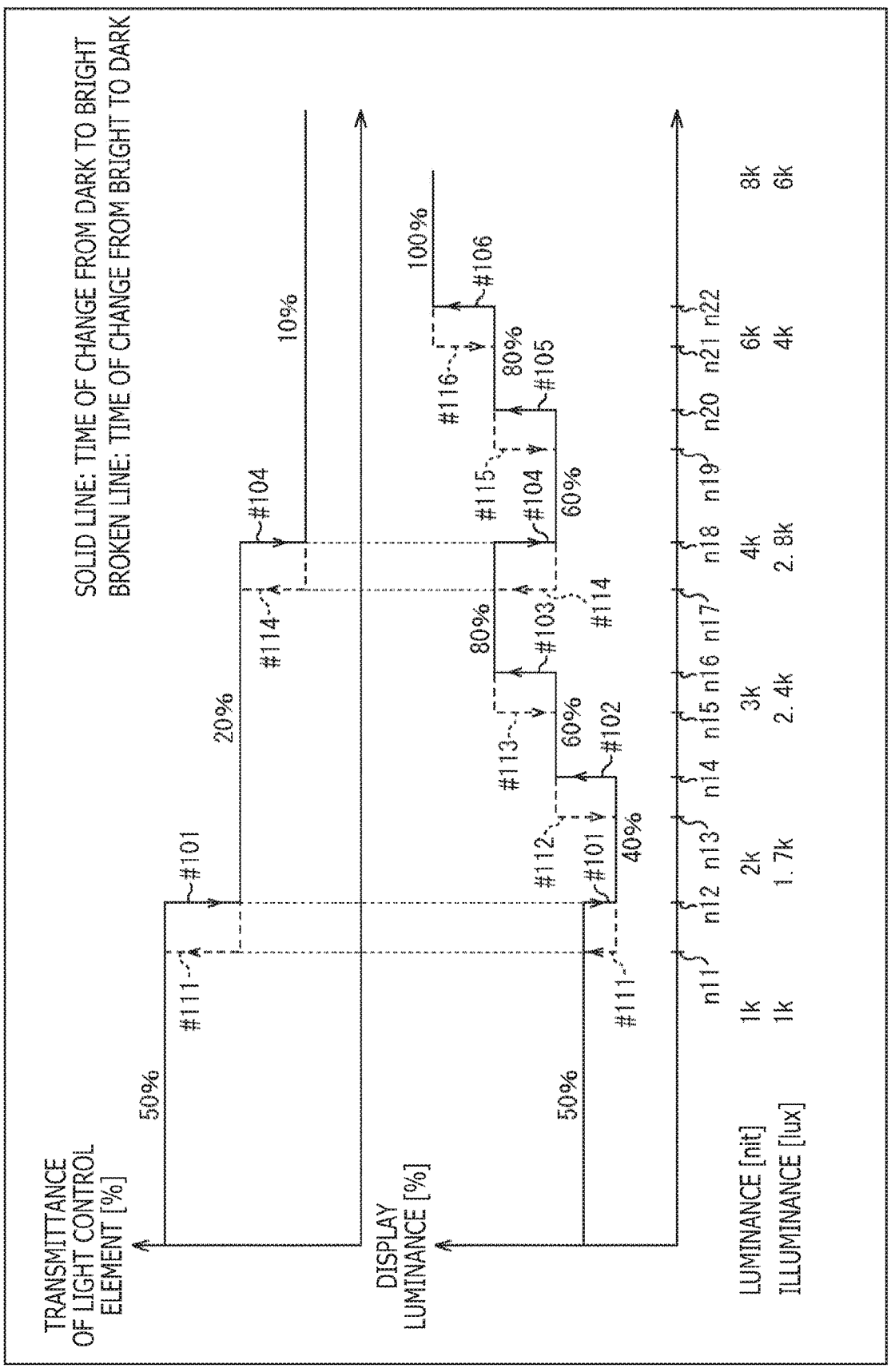
FIG. 21 is another diagram depicting an example of setting the transmittance and the display luminance.

FIG. 21 is another diagram depicting an example of setting the transmittance and the display luminance.

An upper portion of FIG. 21 represents a change in the transmittance while a horizontal axis indicates the surrounding brightness and a vertical axis indicates the transmittance. It is noted that the transmittance mentioned herein is transmittance of the overall HMD 1 realized by adjusting the transmittance of the light control element 14 as described above. Furthermore, a lower portion of FIG. 21 represents a change in the display luminance while a horizontal axis indicates the surrounding brightness and a vertical axis indicates the display luminance of the display section 11.

As described with reference to FIG. 20, in a case of a change in the surroundings from the dark state to the bright state, the transmittance changes from 50% to 20% at the brightness n12 and changes from 20% to 10% at brightness n18. Furthermore, in a case of a change in the surroundings from the bright state to the dark state, the transmittance changes from 10% to 20% at brightness n17 and changes from 20% to 50% at the brightness n11.

As described with reference to FIG. 20, in the case of the change in the surroundings from the dark state to the bright state, the display luminance changes from 50% to 40% at the brightness n12 and changes from 40% to 60% at the brightness n14. Furthermore, the display luminance changes from 60% to 80% at brightness n16 and changes from 80% to 60% at brightness n18. The display luminance changes from 60% to 80% at brightness n20 and changes from 80% to 100% at brightness n22.

Moreover, in the case of the change in the surroundings from the bright state to the dark state, the display luminance changes from 100% to 80% at brightness n21 and changes from 80% to 60% at brightness n19. Furthermore, the display luminance changes from 60% to 80% at the brightness n17 and changes from 80% to 60% at brightness n15. The display luminance changes from 60% to 40% at brightness n13 and changes from 40% to 50% at the brightness n11.

At the normal times, the HMD 1 displays the various kinds of information using such combinations of the transmittance and the display luminance. Control over the transmittance and the display luminance according to the surrounding brightness is exercised at, for example, an interval according to the state of the user such as the moving speed of the user.

It is noted herein that in a case of using the wearable terminal such as the HMD 1 outdoor, displayed content is often less visible due to quite strong outside light. To address such circumstances, technologies for controlling the transmittance on the basis of an output value from the illuminance sensor are disclosed in, for example, JP 2012-252091A and JP 2013-5201A.

As the light control element, it is conceivable to use, for example, an electrochromic element. The electrochromic element changes the transmittance by making use of the oxidation reaction and the reduction reaction of a material.

The light control element making use of a chemical reaction such as ion diffusion is slower in a reaction speed to the change in the transmittance than that of an element such as a liquid crystal shutter by approximately a few seconds. The slow reaction speed possibly causes occurrence of a situation in which the rise of the transmittance is delayed and the user's field of view remains dark for a few seconds in a case in which the user moves from a bright location to a dark location.

To deal with the slow response speed, it is conceivable to take measures of setting a brightness detection cycle short. In a case of setting the brightness detection cycle short, however, the transmittance also changes in parallel with a short-time change in the brightness. A frequent change in the transmittance often causes the user to feel uncomfortable.

In other words, it is preferable that the light control element is made to quickly react to the change in the brightness, but the excessively frequent change in the transmittance often causes the user to feel uncomfortable.

In the HMD 1, various kinds of processing such as the control over the transmittance and the display luminance at an interval according to the state of the user are performed to prevent the user from feeling uncomfortable.

Example 1 of Configurations

Figure 22:
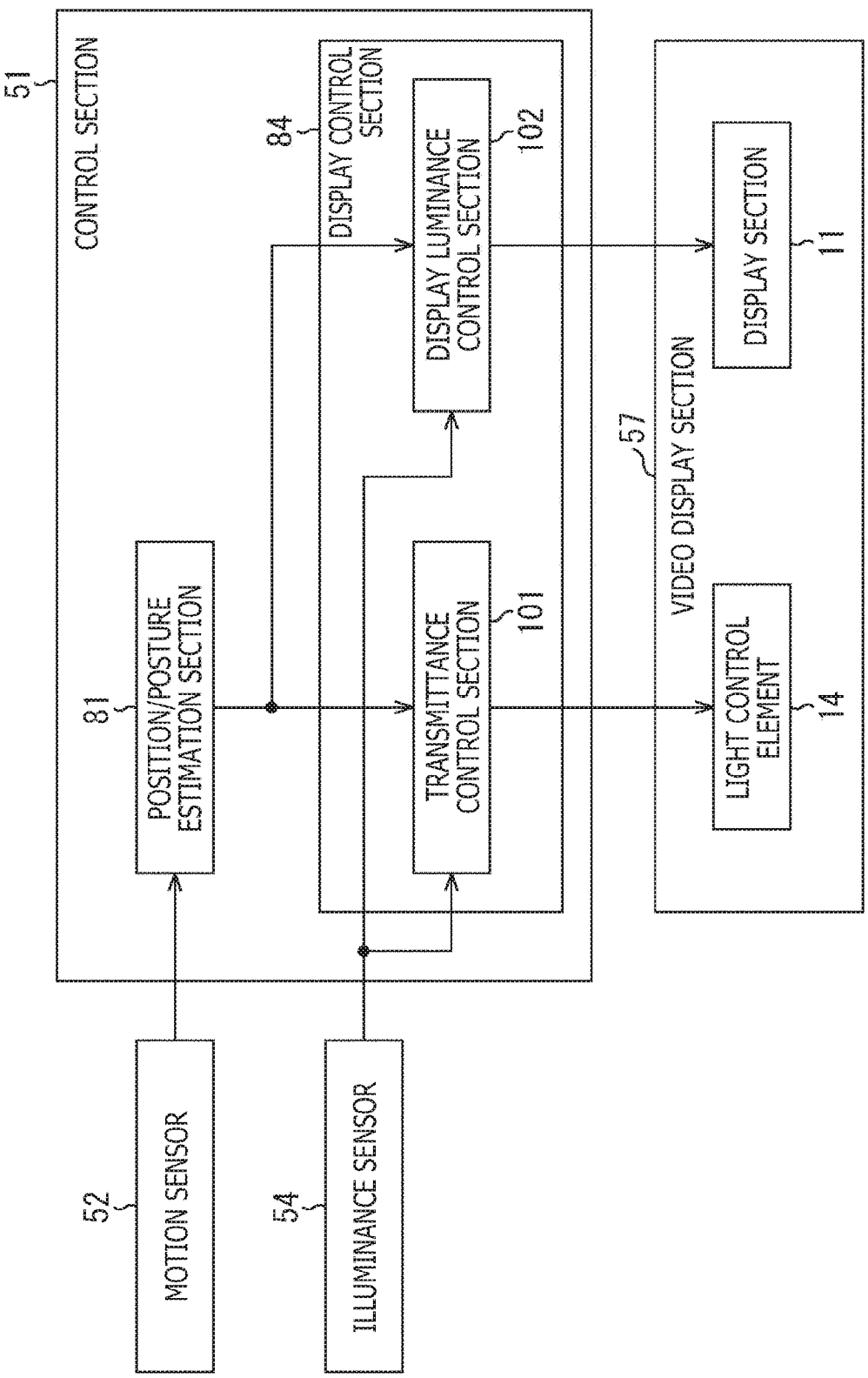
FIG. 22 is a block diagram depicting an example of configurations of an HMD.

FIG. 22 is a block diagram depicting an example of configurations of the HMD 1.

In the configurations depicted in FIG. 22, the same configurations as those described with reference to FIG. 12 are denoted by the same reference characters. Repetitive description will be omitted, as appropriate.

Figure 24:
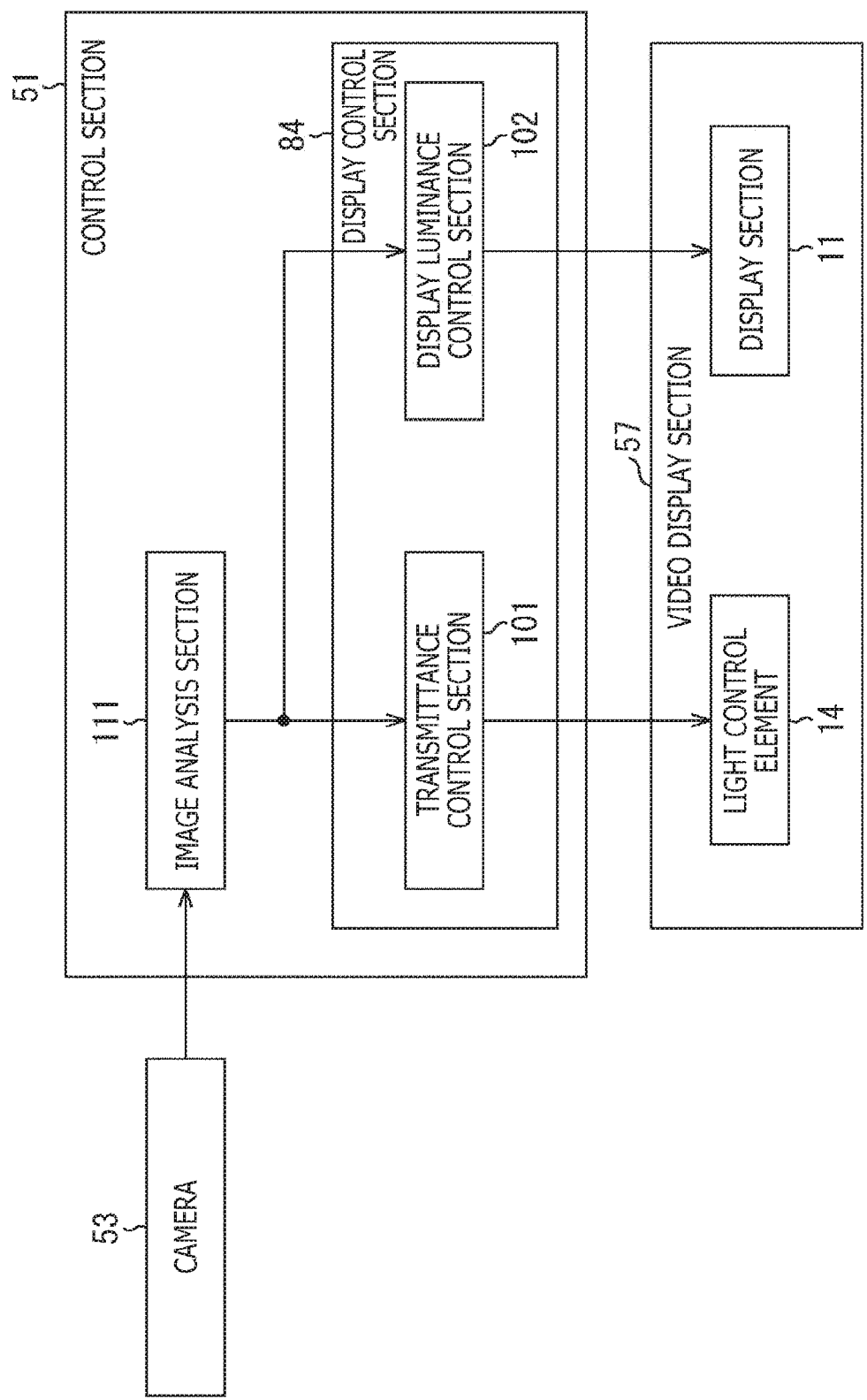
FIG. 24 is a block diagram depicting another example of the configurations of the HMD.
Figure 26:
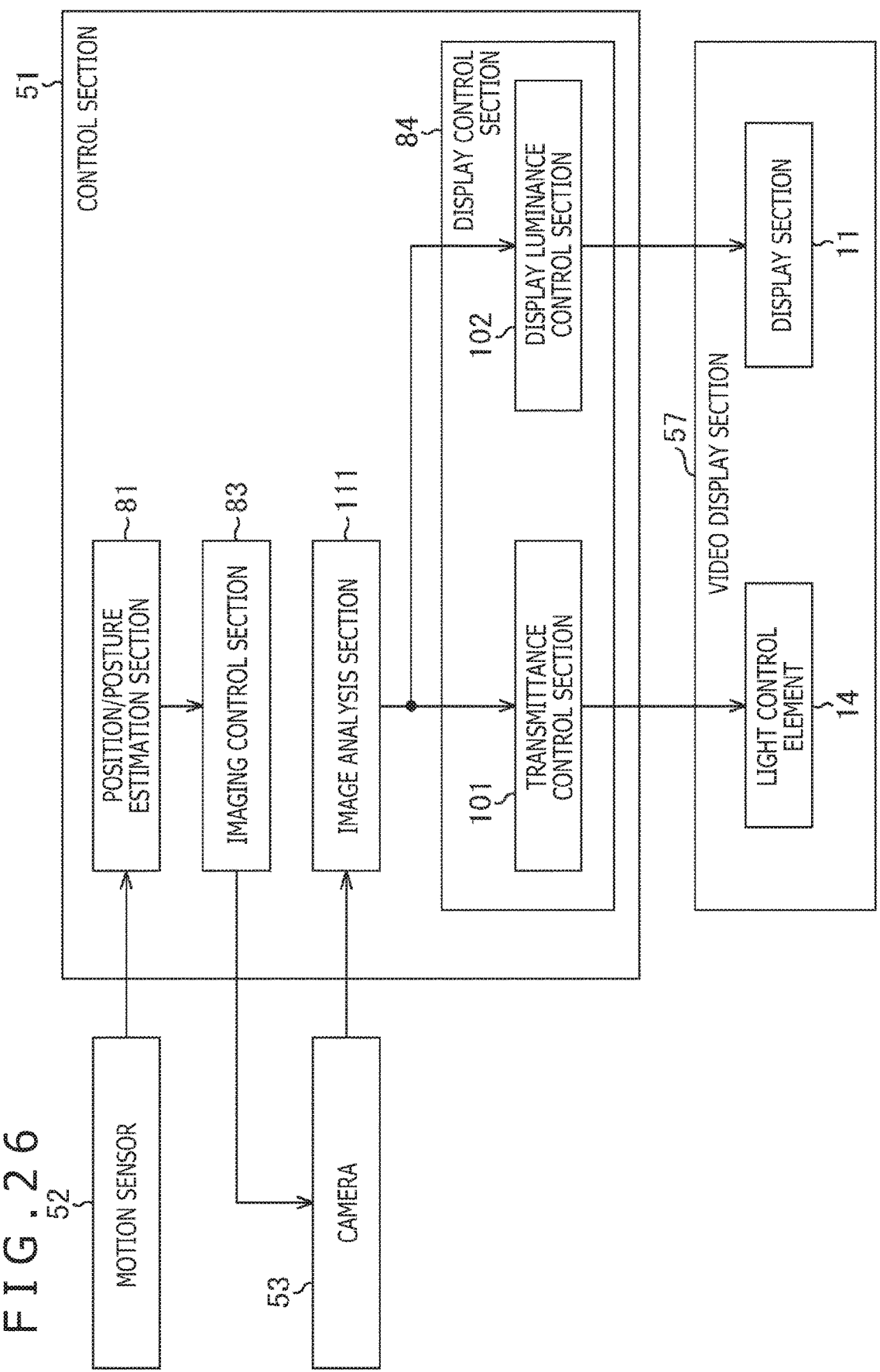
FIG. 26 is a block diagram depicting yet another example of the configurations of the HMD.
Figure 28:
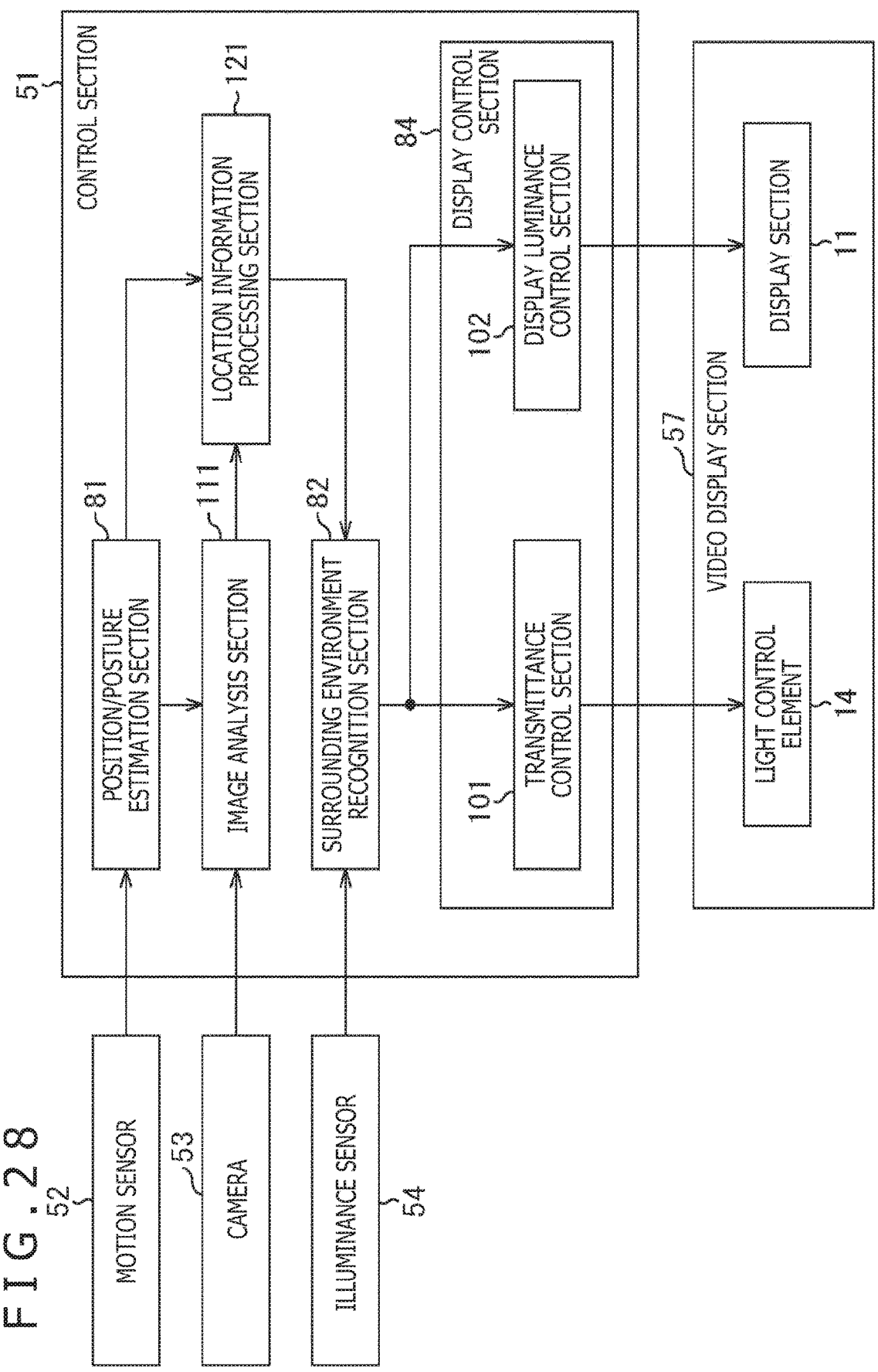
FIG. 28 is a block diagram depicting still another example of the configurations of the HMD.

It is noted that FIG. 22 depicts only part of the configurations of the HMD 1. The HMD 1 of FIG. 22 includes the other configurations described with reference to FIG. 12. Configurations depicted in FIGS. 24, 26, and 28 are similar to those in FIG. 22.

The control section 51 of FIG. 22 is configured with the position/posture estimation section 81 and the display control section 84. The display control section 84 is configured with a transmittance control section 101 and a display luminance control section 102.

The position/posture estimation section 81 analyzes sensor data supplied from the motion sensor 52 and estimates the state of the user. The state of the user estimated by the position/posture estimation section 81 includes at least any of a type of motion of the user or a motion speed of the user. The information regarding the acceleration detected by the acceleration sensor 71 configuring the motion sensor 52 and the angular speed detected by the gyro sensor 72 is supplied to the position/posture estimation section 81 as the sensor data.

Types of motion in, for example, a situation in which a motion such as a shake of a user's head occurs and a situation in which the HMD 1 is moving without user's body movement, without involvement of the change in the brightness, are classified on the basis of a change in the acceleration. Furthermore, the motion speed of the user is detected by an integral value of the acceleration. A geomagnetic sensor may be provided in the motion sensor 52, and the motion speed of the user or the like may be detected on the basis of information associated with a bearing.

The position/posture estimation section 81 outputs information representing the type of motion of the user and the motion speed of the user to the transmittance control section 101 and the display luminance control section 102.

The transmittance control section 101 identifies the state of the user by the information supplied from the position/posture estimation section 81 and adjusts the read-out interval of the surrounding illuminance detected by the illuminance sensor 54. The surrounding illuminance is repeatedly detected by the illuminance sensor 54 in a predetermined cycle.

The transmittance control section 101 reads out the surrounding illuminance according to the adjusted read-out interval and controls the transmittance of the light control element 14 whenever reading out the surrounding illuminance, as described with reference to FIG. 20 and the like. By controlling the read-out interval of the surrounding illuminance, an interval of controlling the transmittance of the light control element 14 is also controlled.

In the case, for example, in which the user stands still, the transmittance control section 101 reads out the surrounding illuminance at a long interval such as an interval of one second or longer. In the case in which the user stands still, a situation of the sudden change in the surrounding environment hardly occurs, and it is not necessary to set the interval of controlling the transmittance by the transmittance control section 101 that short.

By controlling the transmittance at a long interval such as an interval of one second or longer, the transmittance of the light control element 14 is not controlled even in a case of momentary interruption ahead; thus, it is possible to prevent the user from feeling uncomfortable.

Furthermore, in a case in which the user is walking, the transmittance control section 101 reads out the surrounding illuminance at a short interval such as an interval of 0.1 seconds. In the case in which the user is walking, it is supposed that the user moves to locations at different degrees of brightness such as movement from a bright outdoor location to a dark indoor location; thus, the transmittance control section 101 sets the read-out interval of the surrounding illuminance to be short.

Controlling the transmittance at a short interval such as an interval of 0.1 seconds or longer enables an operation without a sense of delay even in a case of a slow response speed of the light control element 14.

The display luminance control section 102 controls the read-out interval of the surrounding illuminance and a control interval of the display luminance similarly to the transmittance control section 101.

In other words, the display luminance control section 102 identifies the state of the user by the information supplied from the position/posture estimation section 81 and adjusts the read-out interval of the surrounding illuminance. The display luminance control section 102 reads out the surrounding illuminance according to the adjusted read-out interval, and controls the display luminance of the display section 11 whenever reading out the surrounding illuminance, as described with reference to FIG. 20 and the like.

In a case, for example, in which the user stands still, the display luminance control section 102 reads out the surrounding illuminance at a long interval such as an interval of one second or longer. In addition, in the case in which the user is walking, the display luminance control section 102 reads out the surrounding illuminance at the short interval such as an interval of 0.1 seconds.

Figure 23:
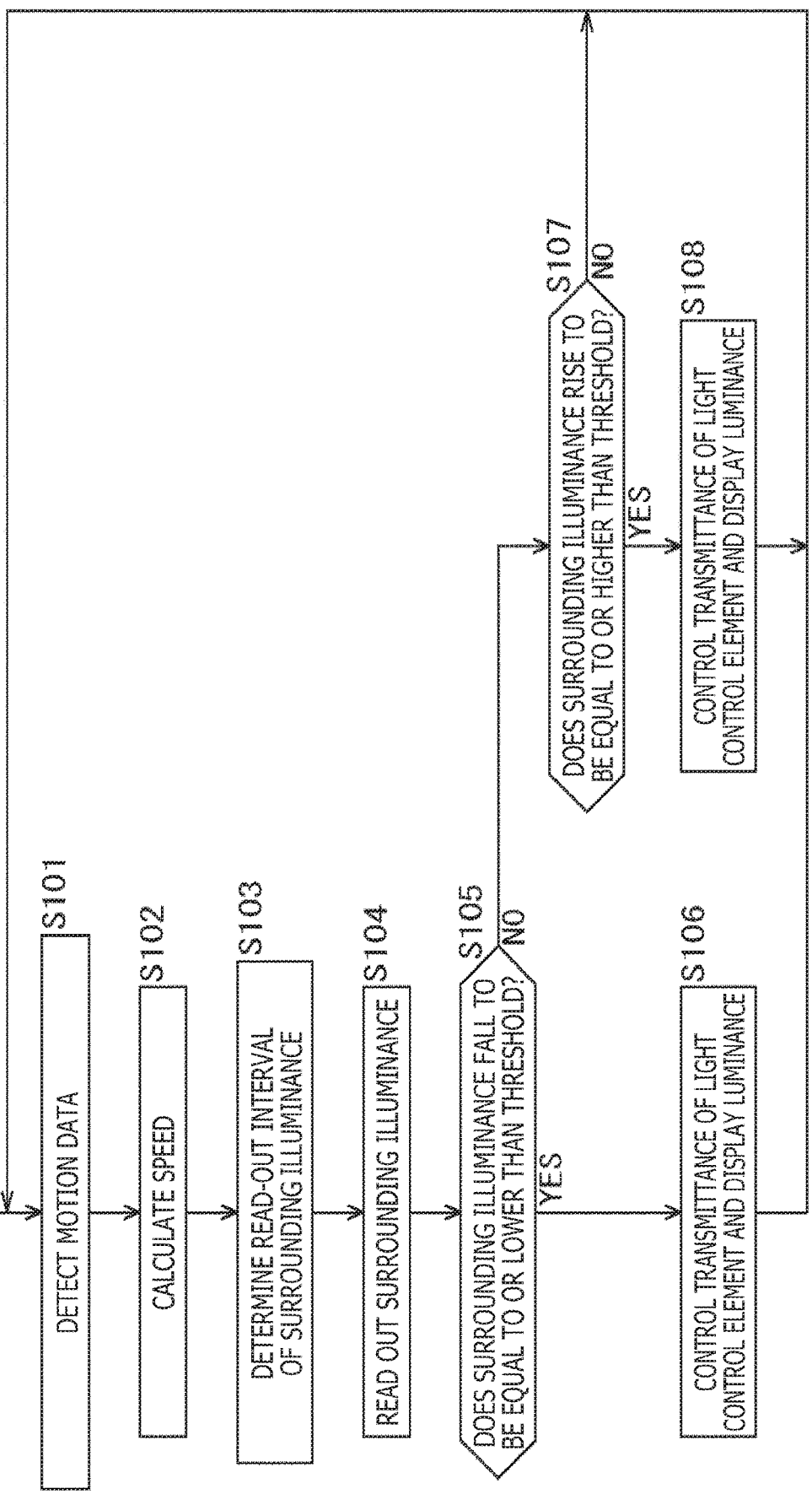
FIG. 23 is a flowchart illustrating display control processing by the HMD having the configurations of FIG. 22.

Display control processing by the HMD 1 having the configurations of FIG. 22 will now be described with reference to a flowchart of FIG. 23.

In Step S101, the acceleration sensor 71 in the motion sensor 52 detects the acceleration of the HMD 1, and the gyro sensor 72 detects the angular speed of the HMD 1. The information regarding the acceleration and the information regarding the angular speed are supplied to the position/posture estimation section 81 as the motion data.

In Step S102, the position/posture estimation section 81 analyzes the motion data supplied from the motion sensor 52, estimates the type of motion of the user, and calculates the motion speed of the user. Information representing the type of motion of the user and the motion speed of the user is supplied to the transmittance control section 101 and the display luminance control section 102.

In Step S103, the display control section 84 (transmittance control section 101 and display luminance control section 102) identifies the state of the user by the information supplied from the position/posture estimation section 81 and determines the read-out interval of the surrounding illuminance detected by the illuminance sensor 54.

In Step S104, the display control section 84 reads out the surrounding illuminance according to the determined read-out interval.

In Step S105, the display control section 84 determines whether or not the surrounding illuminance falls to be equal to or lower than a threshold.

In a case of determining in Step S105 that the surrounding illuminance is equal to or lower than the threshold, the display control section 84 controls the transmittance and the display luminance in Step S106. In other words, the transmittance control section 101 adjusts the transmittance of the light control element 14 and the display luminance control section 102 adjusts the display luminance of the display section 11 by use of the combination for a case in which the surrounding illuminance falls to be lower than the threshold as described with reference to FIGS. 20 and 21.

On the other hand, in a case of determining in Step S105 that the surrounding illuminance is not equal to or lower than the threshold, the display control section 84 determines whether or not the surrounding illuminance rises to be equal to or higher than the threshold in Step S107.

In a case of determining in Step S107 that the surrounding illuminance is equal to or higher than the threshold, the display control section 84 controls the transmittance and the display luminance in Step S108. In other words, the transmittance control section 101 adjusts the transmittance of the light control element 14 and the display luminance control section 102 adjusts the display luminance of the display section 11 by use of the combination for a case in which the surrounding illuminance rises to be higher than the threshold as described with reference to FIGS. 20 and 21.

In a case of determining in Step S107 that the surrounding illuminance is not equal to or higher than the threshold, or after the processing is performed in Steps S106 and S108, the processing returns to Step S101, and a series of processing described above is repeated.

As described so far, determining the read-out interval of the surrounding illuminance on the basis of the motion speed of the user makes it possible to adjust the transmittance and the display luminance without delay with respect to the change in brightness even in the case in which the user is walking.

Adjusting the transmittance and the display luminance without delay makes it possible to ensure user's safety at the time of walking.

Furthermore, when user is standing still, the transmittance and the display luminance do not frequently change; thus, there is no reaction to the short-time change in the brightness, and it is possible to suppress occurrence of unpleasant changes in the transmittance and the display luminance. Furthermore, prolonging the interval at which the transmittance and the display luminance are controlled enables a reduction in computing resources, saving of power consumption, and distribution of resources to image rendering and the like.

Figure 25:
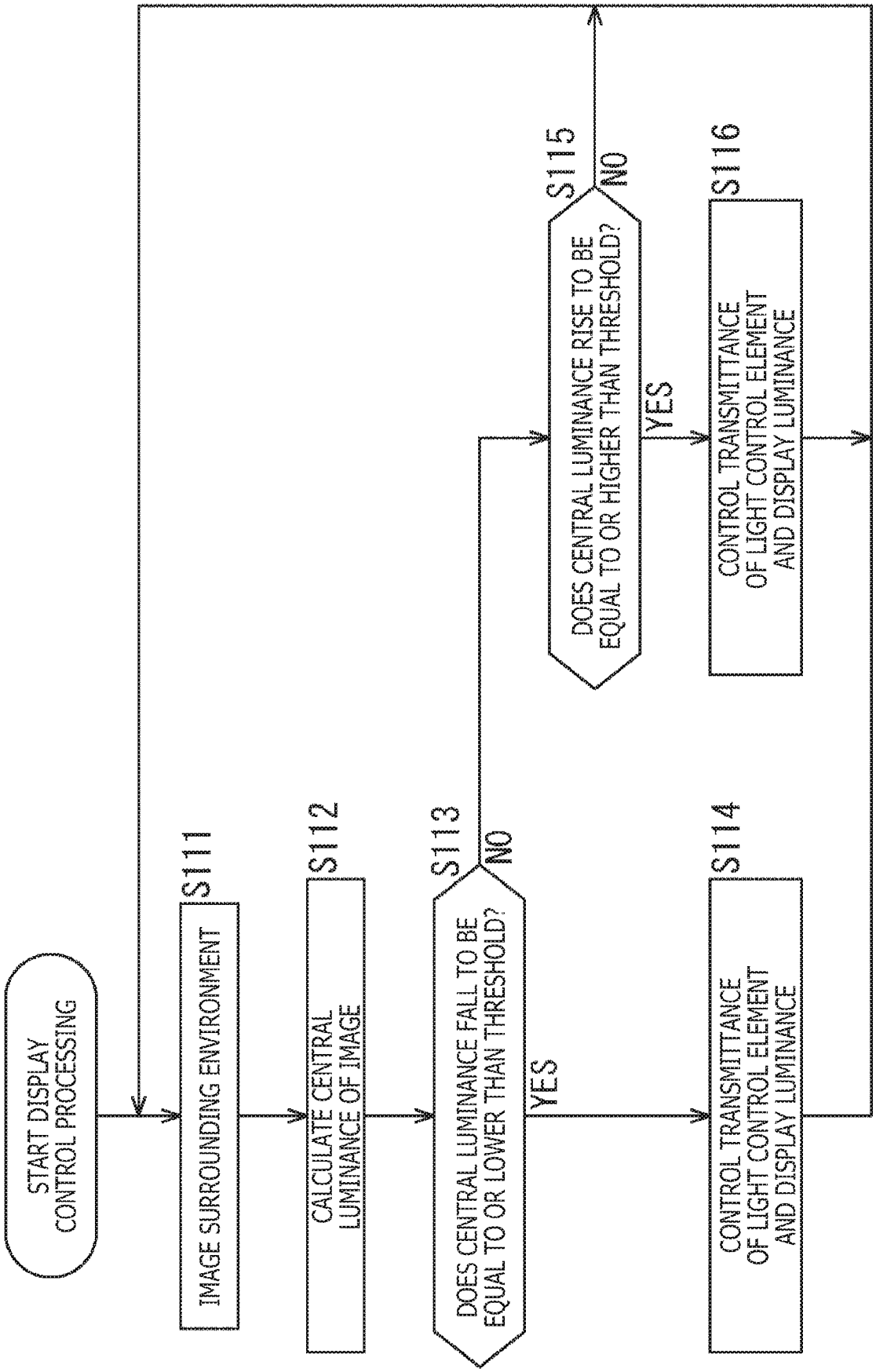
FIG. 25 is a flowchart illustrating display control processing by the HMD having the configurations of FIG. 24.
Figure 27:
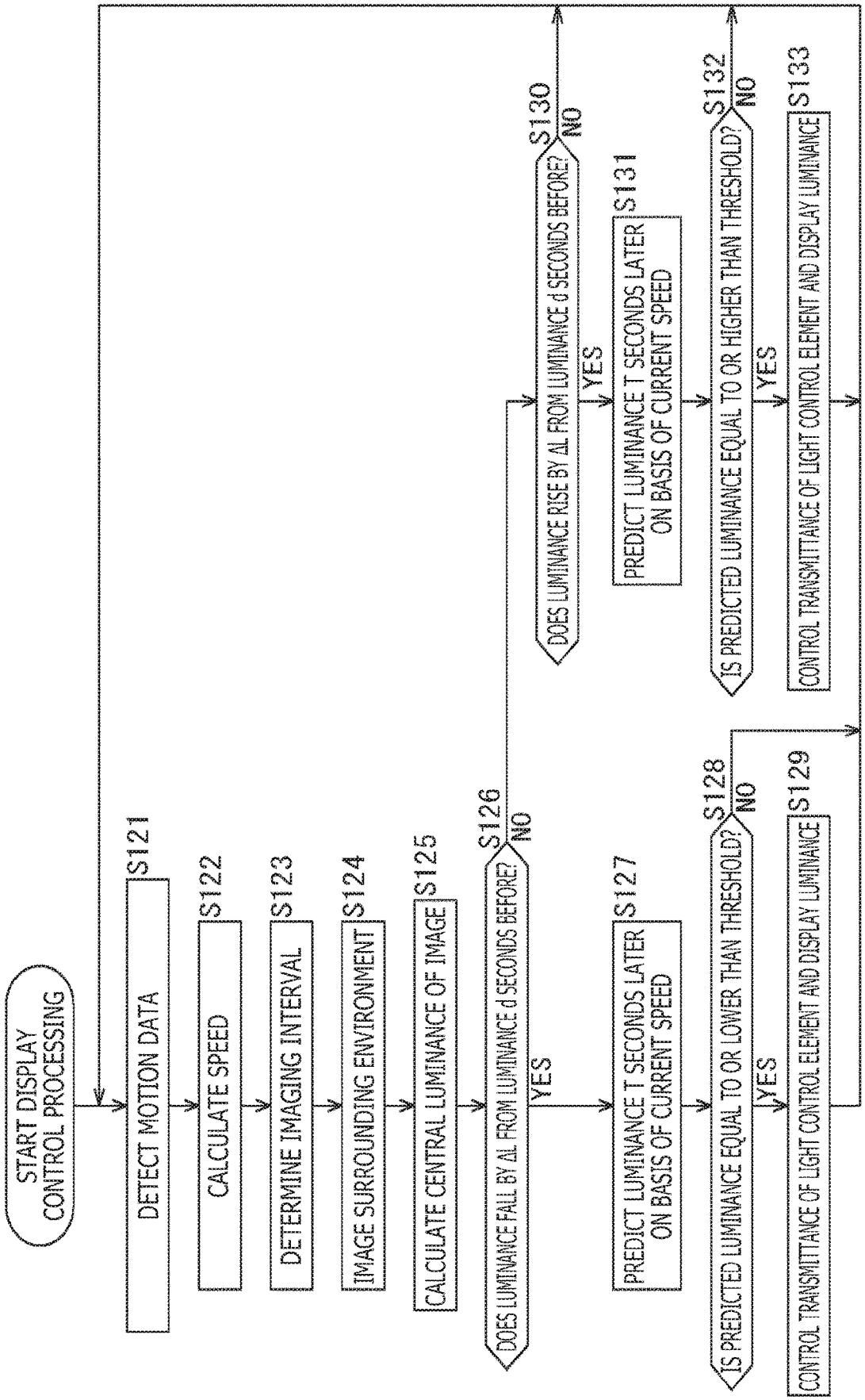
FIG. 27 is a flowchart illustrating display control processing by the HMD having the configurations of FIG. 26.

Such display control processing is performed in Step S1 of FIG. 13. Likewise, display control processing described with reference to FIGS. 25, 27, and 29 is processing performed in Step S1 of FIG. 13.

The illuminance sensor 54 may adjust a detection interval of the surrounding illuminance without adjusting the read-out interval of the surrounding illuminance detected by the illuminance sensor 54.

Example 2 of Configurations

FIG. 24 is a block diagram depicting another example of configurations of the HMD 1.

Configurations of the control section 51 in the HMD 1 depicted in FIG. 24 differ from those depicted in FIG. 22 in that an image analysis section 111 is provided as an alternative to the position/posture estimation section 81. An image captured by the camera 53 is supplied to the image analysis section 111. Imaging by the camera 53 is repeatedly performed in a predetermined cycle.

In the HMD 1 of FIG. 24, brightness after passage of a predetermined period of time is predicted by analyzing the image captured by the camera 53, and the transmittance and the display luminance are controlled according to a change in the predicted brightness.

The image analysis section 111 detects the change in the brightness by comparing central luminance of a current image with central luminance of an image captured just before the current image. The central luminance is luminance in a predetermined range including a center of the image. The change in the brightness may be detected using luminance of an overall image.

Since a front direction of the user matches an imaging direction of the camera 53, the user intended to move is considered to face a moving direction, that is, a central portion of the image. It may be said that the luminance of the central portion of the image represents the luminance of the overall image obtained after the predetermined period of time.

The image analysis section 111 determines the direction of the central portion of the image as the moving direction of the user and calculates the central luminance that is the luminance of the central portion of the image as the luminance representing the brightness after passage of the predetermined period of time. The image analysis section 111 outputs information regarding the central luminance to the transmittance control section 101 and the display luminance control section 102.

The transmittance control section 101 controls the transmittance of the light control element 14 on the basis of the central luminance represented by the information supplied from the image analysis section 111, as described with reference to FIG. 20 and the like. By performing processing according to the central luminance, the transmittance is controlled in advance in a way.

The display luminance control section 102 controls the display luminance of the display section 11 on the basis of the central luminance represented by the information supplied from the image analysis section 111, as described with reference to FIG. 20 and the like. By performing processing according to the central luminance, the display luminance of the display section 11 is controlled in advance in a way.

The display control processing by the HMD 1 having the configurations of FIG. 24 will now be described with reference to a flowchart of FIG. 25.

In Step S111, the camera 53 images the surrounding environment.

In Step S112, the image analysis section 111 calculates the central luminance of the image captured by the camera 53.

In Step S113, the display control section 84 determines whether or not the central luminance falls to be equal to or lower than a threshold.

In a case of determining in Step S113 that the central luminance is equal to or lower than the threshold, the display control section 84 controls the transmittance and the display luminance in Step S114. The transmittance control section 101 adjusts the transmittance of the light control element 14 and the display luminance control section 102 adjusts the display luminance of the display section 11 by use of the combination for a case in which the luminance falls to be lower than the threshold as described with reference to FIGS. 20 and 21.

On the other hand, in a case of determining in Step S113 that the central luminance does not fall to be equal to or lower than the threshold, the display control section 84 determines whether or not the central luminance rises to be equal to or higher than the threshold in Step S115.

In a case of determining in Step S115 that the central luminance is equal to or higher than the threshold, the display control section 84 controls the transmittance and the display luminance in Step S116. The transmittance control section 101 adjusts the transmittance of the light control element 14 and the display luminance control section 102 adjusts the display luminance of the display section 11 by use of the combination for a case in which the luminance rises to be higher than the threshold as described with reference to FIGS. 20 and 21.

In a case of determining in Step S115 that the central luminance is not equal to or higher than the threshold, or after processing of Steps S114 and S116 is performed, the processing returns to Step S111, and a series of the processing described above is repeated.

Through the processing described so far, by predicting the brightness of the environment in which the user is estimated to be present after passage of the predetermined period of time, on the basis of the image captured by the camera 53, the transmittance and the display luminance can be adjusted without delay.

Example 3 of Configurations

FIG. 26 is a block diagram depicting yet another example of the configurations of the HMD 1.

Configurations of the control section 51 in the HMD 1 depicted in FIG. 26 differ from those depicted in FIG. 24 in that the position/posture estimation section 81 and the imaging control section 83 are provided. In the HMD 1 of FIG. 26, an imaging interval by the camera 53 is adjusted according to the state of the user. In addition, the surrounding brightness is predicted from the image captured by the camera 53, and the transmittance and the display luminance are controlled according to a change in the predicted brightness.

The position/posture estimation section 81 analyzes the sensor data supplied from the motion sensor 52 and detects the type of motion of the user and the motion speed of the user. The position/posture estimation section 81 outputs the information representing the type of motion of the user and the motion speed of the user to the imaging control section 83.

The imaging control section 83 identifies the state of the user by the information supplied from the position/posture estimation section 81 and adjusts the imaging interval by the camera 53.

In the case, for example, in which the user is standing still, the imaging control section 83 images the surroundings at a long interval such as an interval of one second or longer. In addition, in the case in which the user is walking, the transmittance control section 101 images the surroundings at a short interval such as an interval of 0.1 seconds. An image captured by the camera 53 according to the adjusted interval is supplied to the image analysis section 111.

Similarly to the image analysis section 111 of FIG. 24, the image analysis section 111 detects the change in the brightness on the basis of the central luminance of the image captured by the camera 53.

The display control processing by the HMD 1 having the configurations of FIG. 26 will now be described with reference to a flowchart of FIG. 27.

In Step S121, the acceleration sensor 71 in the motion sensor 52 detects the acceleration of the HMD 1, and the gyro sensor 72 detects the angular speed of the HMD 1. The information regarding the acceleration and the information regarding the angular speed are supplied to the position/posture estimation section 81 as the motion data.

In Step S122, the position/posture estimation section 81 analyzes the motion data supplied from the motion sensor 52, estimates the type of motion of the user, and calculates the motion speed of the user. The information representing the type of motion of the user and the motion speed of the user is supplied to the imaging control section 83.

In Step S123, the imaging control section 83 identifies the state of the user by the information supplied from the position/posture estimation section 81 and determines the imaging interval by the camera 53.

In Step S124, the camera 53 images the surrounding environment according to the imaging interval determined by the imaging control section 83.

In Step S125, the image analysis section 111 calculates the central luminance of the image captured by the camera 53.

In Step S126, the image analysis section 111 determines whether or not the central luminance falls by $\Delta L$ from the luminance preset time before, that is, d seconds before. $\Delta L$ represents predetermined luminance.

In a case of determining in Step S126 that the central luminance falls by $\Delta L$ from the luminance d seconds before, the image analysis section 111 predicts the overall luminance of the image to be obtained T seconds later on the basis of a current speed of the user in Step S127. For example, a range according to the current speed of the user is set in the image captured by the camera 53, and luminance of the set range is obtained as predicted luminance of the overall image to be obtained T seconds later.

In Step S128, the image analysis section 111 determines whether or not the predicted luminance is equal to or lower than a threshold.

In a case of determining in Step S128 that the predicted luminance is equal to or lower than the threshold, the display control section 84 controls the transmittance and the display luminance in Step S129. The transmittance control section 101 adjusts the transmittance of the light control element 14 and the display luminance control section 102 adjusts the display luminance of the display section 11 by use of the combination for the case in which the luminance falls to be lower than the threshold as described with reference to FIGS. 20 and 21.

On the other hand, in a case of determining in Step S126 that the central luminance does not fall by ΔL from the luminance d seconds before, the image analysis section 111 determines whether or not the central luminance rises by ΔL from the luminance d seconds before in Step S130.

In a case of determining in Step S130 that the central luminance rises by ΔL from the luminance d seconds before, the image analysis section 111 predicts the luminance of the overall image to be obtained T seconds later on the basis of the current speed of the user in Step S131.

In Step S132, the image analysis section 111 determines whether or not the predicted luminance is equal to or higher than a threshold.

In a case of determining in Step S132 that the predicted luminance is equal to or higher than the threshold, the display control section 84 controls the transmittance and the display luminance in Step S133. The transmittance control section 101 adjusts the transmittance of the light control element 14 and the display luminance control section 102 adjusts the display luminance of the display section 11 by use of the combination for a case in which the luminance rises to be higher than the threshold as described with reference to FIGS. 20 and 21.

In a case of determining in Step S132 that the predicted luminance is not equal to or higher than the threshold, the processing returns to Step S121, and a series of processing described above is repeated. Similarly, in a case of determining in Step S130 that the central luminance does not rise by ΔL from the luminance d seconds before, or after processing of Steps S129 and S133 is performed, the processing returns to Step S121, and a series of processing described above is repeated.

Through the processing described so far, by not only adjusting the transmittance and the display luminance to follow the movement of the user but also predicting the brightness of the environment after passage of the predetermined period of time according to the state of the user, the transmittance and the display luminance can be adjusted.

Setting of T seconds may be changed over between the case in which the user is walking and a case in which the user is running. For example, in the case in which the user is running, brightness at a time ahead by a shorter time than that in the case in which the user is walking is predicted.

Example 4 of Configurations

FIG. 28 is a block diagram depicting still another example of the configurations of the HMD 1.

Configurations of the control section 51 in the HMD 1 depicted in FIG. 28 differ from those depicted in FIG. 26 in that the surrounding environment recognition section 82 and a location information processing section 121 are provided as an alternative to the imaging control section 83. In the HMD 1 of FIG. 28, surrounding brightness after passage of a predetermined period of time is predicted on the basis of location information, and the transmittance and the display luminance are controlled according to a change in the predicted brightness. The location information is information regarding the position of the user.

The position/posture estimation section 81 analyzes the sensor data supplied from the motion sensor 52 and detects the type of motion of the user and the motion speed of the user. The position/posture estimation section 81 outputs the information representing the type of motion of the user and the motion speed of the user to the image analysis section 111 and the location information processing section 121.

The image analysis section 111 analyzes the image captured by the camera 53 according to detection of the type of motion of the user and the motion speed of the user by the position/posture estimation section 81 and extracts features of the surrounding environment in the image. The image analysis section 111 outputs information associated with the features of the surrounding environment to the location information processing section 121. The features of the surrounding environment extracted by the image analysis section 111 are used in estimating a current position.

The location information processing section 121 estimates the current position on the basis of the features represented by the information supplied from the image analysis section 111. For example, information associated with features of each position on a map as well as map information are provided to the location information processing section 121 in advance.

The location information processing section 121 estimates the current position by collating the features represented by the information supplied from the image analysis section 111 with the features of each position provided in advance. The current position is estimated as appropriate by correcting the position according to the state of the user detected by the position/posture estimation section 81.

The location information processing section 121 estimates a position at a point of time after a predetermined period of time has elapsed from the current position according to the state of the user detected by the position/posture estimation section 81 and outputs information representing a result of estimation together with information regarding the current position to the surrounding environment recognition section 82.

The surrounding environment recognition section 82 identifies the surrounding illuminance detected by the illuminance sensor 54 as surrounding illuminance at the current position.

In addition, the surrounding environment recognition section 82 estimates surrounding illuminance at the position after passage of the predetermined period of time represented by the information supplied from the location information processing section 121. For example, information regarding surrounding illuminance at each position on a map as well as map information are provided to the surrounding environment recognition section 82 in advance.

Referring to the information regarding the surrounding illuminance at each position provided in advance, the surrounding environment recognition section 82 identifies the surrounding illuminance at the position estimated by the location information processing section 121. For example, surrounding illuminance at a position T seconds after the present time is predicted by the surrounding environment recognition section 82.

Display control processing by the HMD 1 having the configurations of FIG. 28 will now be described with reference to a flowchart of FIG. 29.

In Step S141, the acceleration sensor 71 in the motion sensor 52 detects the acceleration of the HMD 1, and the gyro sensor 72 detects the angular speed of the HMD 1. The information regarding the acceleration and the information regarding the angular speed are supplied to the position/posture estimation section 81 as the motion data.

In Step S142, the position/posture estimation section 81 analyzes the motion data supplied from the motion sensor 52, estimates the type of motion of the user, and calculates the motion speed of the user. The information regarding the type of motion of the user and the motion speed of the user are supplied to the image analysis section 111 and the location information processing section 121.

In Step S143, the camera 53 images the surrounding environment. An image captured by the camera 53 is supplied to the image analysis section 111.

In Step S144, the image analysis section 111 analyzes the image captured by the camera 53 and extracts features of a surrounding environment in the image. Information associated with the features of the surrounding environment is supplied to the location information processing section 121.

In Step S145, the location information processing section 121 estimates the current position on the basis of the features represented by the information supplied from the image analysis section 111.

In Step S146, the surrounding environment recognition section 82 acquires the surrounding illuminance at the current position detected by the illuminance sensor 54.

In Step S147, the surrounding environment recognition section 82 determines whether or not the surrounding illuminance falls by a certain value.

Figure 14:
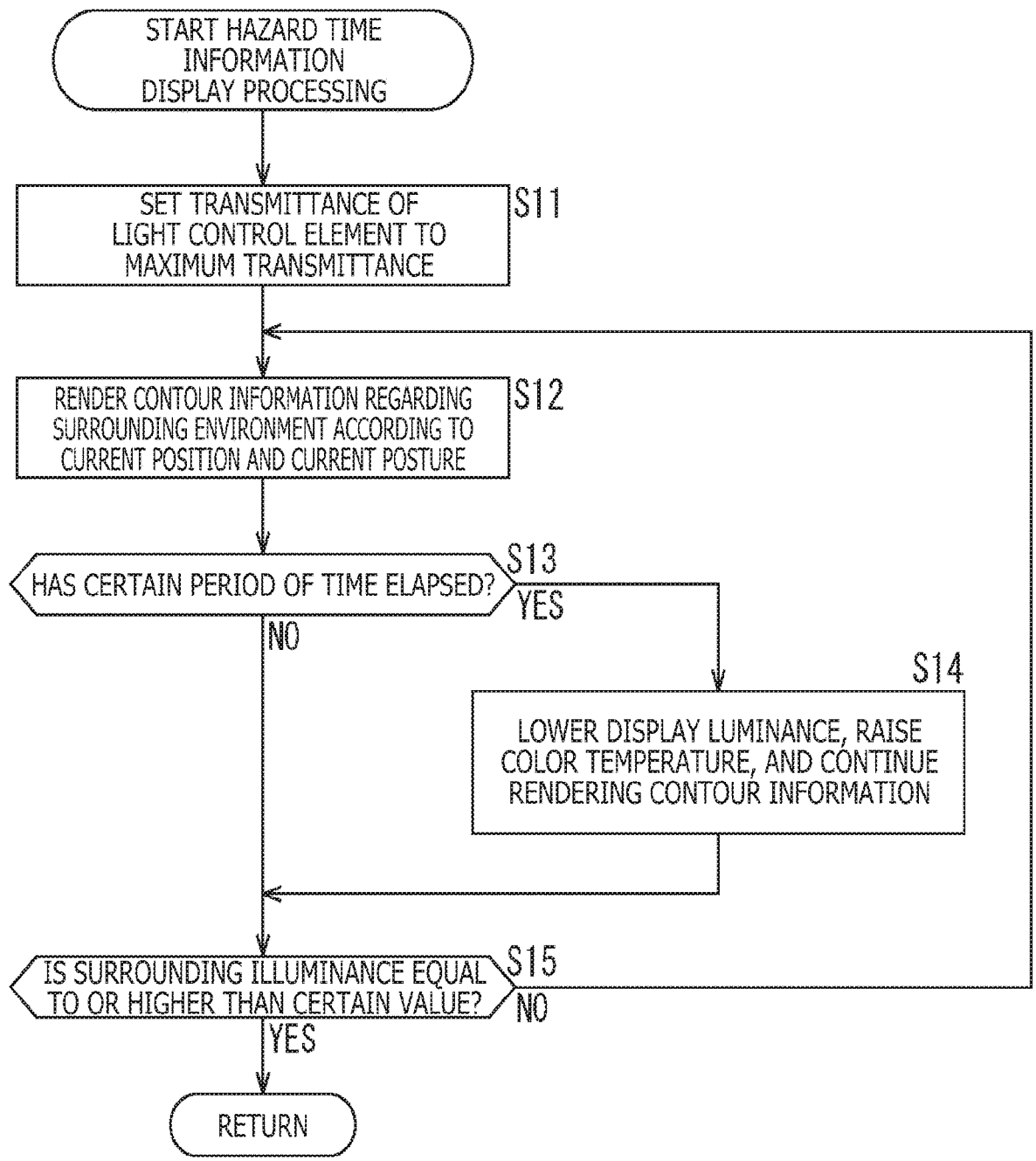
FIG. 14 is a flowchart illustrating hazard time information display processing performed in Step S6 of FIG. 13.

In a case of determining in Step S147 that the surrounding illuminance falls by the certain value due to, for example, a sudden fall in the surrounding illuminance, the hazard time information display processing described with reference to FIG. 14 is performed in Step S148.

In a case of determining in Step S147 that the surrounding illuminance does not fall by the certain value, or in a case of performing the hazard time information display processing in Step S148, the processing goes to Step S149.

In Step S149, the surrounding environment recognition section 82 predicts the surrounding illuminance at the position T seconds later on the basis of a current speed of the user.

In Step S150, the surrounding environment recognition section 82 determines whether or not the surrounding illuminance at the position T seconds later falls to be equal to or lower than a threshold.

In a case of determining in Step S150 that the surrounding illuminance at the position T seconds later is equal to or lower than the threshold, the display control section 84 controls the transmittance and the display luminance in Step S151. The transmittance control section 101 adjusts the transmittance of the light control element 14 and the display luminance control section 102 adjusts the display luminance of the display section 11 by use of the combination for the case in which the surrounding illuminance falls to be lower than the threshold as described with reference to FIGS. 20 and 21.

On the other hand, in a case of determining in Step S150 that the surrounding illuminance at the position T seconds later is not equal to or lower than the threshold, the surrounding environment recognition section 82 determines whether or not the surrounding illuminance at the position T seconds later rises to be equal to or higher than the threshold in Step S152.

In a case of determining in Step S152 that the surrounding illuminance at the position T seconds later is equal to or higher than the threshold, the display control section 84 controls the transmittance and the display luminance in Step S153. The transmittance control section 101 adjusts the transmittance of the light control element 14 and the display luminance control section 102 adjusts the display luminance of the display section 11 by use of the combination for the case in which the surrounding illuminance rises to be higher than the threshold as described with reference to FIGS. 20 and 21.

In a case of determining in Step S152 that the surrounding illuminance T seconds later is not equal to or higher than the threshold, the processing returns to Step S141, and a series of processing described above is repeated. Likewise, in a case of performing the processing in Steps S151 and S153, the processing returns to Step S141, and the series of processing described above is repeated.

Through the processing described so far, by predicting the surrounding illuminance at the position at which the user is estimated to be present after passage of the predetermined period of time, the transmittance and the display luminance can be adjusted without delay with respect to the change in the surrounding illuminance even in the case in which the user is walking.

While it is described that the current position is estimated by analyzing the image, the current position may be estimated using GPS or the like. Using the GPS enables the control section 51 to predict the sudden change in the illuminance near an entrance and an exit of a tunnel or the like and to change the transmittance and the display luminance in advance.

In a case of using the GPS, it is necessary to take measures related to precision of a result of positioning. In a case, for example, in which a dissociation between the speed obtained from a transition of measurement results by the GPS and the speed calculated on the basis of the sensor data detected by the motion sensor 52 is equal to or greater than a certain value, the result of positioning may be corrected on the basis of the speed calculated on the basis of the sensor data detected by the motion sensor 52.

Modifications

The display control described above is applicable not to an eyeglass type wearable terminal but to a mobile terminal such as a smartphone and a tablet terminal.

In a case of, for example, displaying a predetermined image while superimposing the predetermined image on an image captured by a camera of the mobile terminal, then, a transmission factor of the image captured by the camera is adjusted similarly to a transmission factor of the light control element 14, and display luminance of the image displayed to be superimposed on the image captured by the camera is adjusted similarly to the display luminance of the display section 11.

While it is described that the control section (display control section 84) exercising display control and the display section (video display section 57) are provided within the HMD 1, those configurations may be provided outside of the HMD 1. In such a case, the control exercised by the display control section includes not only direct control over the light control element and the display section but also output of a control signal for display to the display section. The control signal may be image data itself to be displayed in one case and may be only a signal for instructing display of the image in another case.

Example of Configurations of Computer

A series of processing described above can be executed by hardware or by software. In a case of executing the series of processing by the software, a program configuring the software is installed into a computer incorporated into dedicated hardware, a general-purpose personal computer, or the like.

FIG. 30 is a block diagram depicting an example of configurations of the hardware of the computer causing a program to execute the series of processing described above.

A CPU (Central Processing Unit) 1001, a ROM (Read Only Memory) 1002, and a RAM (Random Access Memory) 1003 are mutually connected by a bus 1004.

An input/output interface 1005 is also connected to the bus 1004. An input section 1006 configured with a keyboard, a mouse, and the like and an output section 1007 configured with a display, a speaker, and the like are connected to the input/output interface 1005. Furthermore, a storage section 1008 configured with a hard disk, a nonvolatile memory, and the like, a communication section 1009 configured with a network interface and the like, and a drive 1010 driving a removable medium 1011 are connected to the input/output interface 1005.

In the computer configured as described above, the CPU 1001 loads a program stored in, for example, the storage section 1008 to the RAM 1003 via the input/output interface 1005 and the bus 1004 and executes the program, thereby performing the series of processing described above.

The program executed by the CPU 1001 is recorded in, for example, the removable medium 1011 or provided via a wired or wireless transmission medium such as a local area network, the Internet, or a digital satellite service, and is installed to the storage section 1008.

The program executed by the computer may be a program for performing processing in time series in an order described in the present specification or may be a program for performing the processing either in parallel or at a necessary timing such as a timing of calling.

In the present specification, the system means a collection of a plurality of constituent elements (apparatuses, modules (components), and the like), regardless of whether or not all the constituent elements are provided in the same casing. Therefore, a plurality of apparatuses accommodated in separate casings and connected to one another via a network and one apparatus in which a plurality of modules is accommodated in one casing can both be referred to as "systems."

It is noted that the advantages described in the present specification are given as an example only, and the advantages are not limited to those described in the present specification and may contain other advantages.

The embodiments of the present technology are not limited to the embodiments described above, and various changes can be made in a range of not departing from the spirit of the present technology.

For example, the present technology can adopt cloud computing configurations for causing a plurality of apparatuses to process one function in a sharing or cooperative fashion via a network.

Furthermore, each step described in the flowcharts described above can not only be executed by one apparatus but also be executed by a plurality of apparatuses in a sharing fashion.

Moreover, in a case in which one step includes a plurality of series of processing, the plurality of series of processing included in the one step can be not only executed by one apparatus but also executed by a plurality of apparatuses in a sharing fashion.

Examples of Combination of Configurations

The present technology can also be configured as follows.

(1) An information processing apparatus including:

an acquisition section that acquires environmental information that includes information associated with an environment including an object present in a real space; and a display control section that exercises display control based on the environmental information with respect to form information representing a form of the object over a display section that displays predetermined information in a visually recognizable state while superimposing the predetermined information on the real space in a case of occurrence of a change in brightness of the real space higher than a threshold.

(2) The information processing apparatus according to (1), in which the display control section exercises control in such a manner as to display the form information and then display the form information by changing luminance of the form information.

(3) The information processing apparatus according to (1) or (2), in which the display control section controls a change in the luminance of the form information according to attributes of a user or according to a state of the user including at least one of a position or a posture of the user.

(4) The information processing apparatus according to any one of (1) to (3), in which the display control section exercises control in such a manner as to display a contour line of the object as the form information.

(5) The information processing apparatus according to any one of (1) to (4), in which the acquisition section acquires, as the environmental information, information associated with at least any of a position of the object, a distance to the object, a height of the object, or a type of the object.

(6) The information processing apparatus according to any one of (1) to (5), in which the display control section controls display of the form information according to a degree of hazard of the object identified on the basis of the environmental information.

(7) The information processing apparatus according to any one of (1) to (6), in which the display control section exercises control in such a manner as to display a contour line of the object as the form information while changing at least any of a type, a thickness, or a gray level of the contour line according to the degree of hazard.

(8) The information processing apparatus according to any one of (1) to (7), in which the display control section exercises control in such a manner as to display information representing feature points of the object as the form information.

(9) The information processing apparatus according to any one of (1) to (8), further including:

a light control section that guides light in the real space to eyes of a user at predetermined transmittance, in which the display control section controls the light control section in such a manner as to raise transmittance in the case of the occurrence of the change in the brightness higher than the threshold.

(10) The information processing apparatus according to any one of (1) to (9), in which the information processing apparatus includes a head mounted display worn on a head of the user.

(11) The information processing apparatus according to any one of (1) to (10), further including:

an imaging section that images the real space; and an imaging control section that controls the imaging section in such a manner as to increase a gain and prolong exposure time in the case of the occurrence of the change in the brightness higher than the threshold.

(12) The information processing apparatus according to any one of (1) to (11), in which
the display control section exercises control in such a manner as to display the form information and to then display the form information by gradually raising a color temperature.

(13) The information processing apparatus according to any one of (1) to (12), in which
the display control section exercises control in such a manner as to display the form information as an alternative to information displayed before the occurrence of the change in the brightness in the case of the occurrence of the change in the brightness higher than the threshold.

(14) The information processing apparatus according to any one of (1) to (13), in which
the display control section exercises control in such a manner as to end displaying the form information in a case in which the brightness of the real space is equal to predetermined brightness.

(15) An information processing method including:
by an information processing apparatus,
acquiring environmental information that includes information associated with an environment including an object present in a real space; and
exercising display control based on the environmental information with respect to form information representing a form of the object over a display section that displays predetermined information in a visually recognizable state while superimposing the predetermined information on the real space in a case of occurrence of a change in brightness of the real space higher than a threshold.

(16) A recording medium recording a program for causing a computer to execute processing including:
acquiring environmental information that includes information associated with an environment including an object present in a real space; and
exercising display control based on the environmental information with respect to form information representing a form of the object over a display section that displays predetermined information in a visually recognizable state while superimposing the predetermined information on the real space in a case of occurrence of a change in brightness of the real space higher than a threshold.

Furthermore, the present technology can also be configured as follows.

(A) An information processing apparatus including:
a light control section that guides light in a real space to eyes of a user at predetermined transmittance;
a display section that displays predetermined information in a visually recognizable state while superimposing the predetermined information on the real space; and
a display control section that exercises control over the transmittance of the light control section and luminance of the predetermined information displayed by the display section according to brightness of the real space, at an interval according to a state of the user.

(B) The information processing apparatus according to (A), in which
the display control section controls the transmittance of the light control section and the luminance of the predetermined information in a case in which the user stands still at a longer interval than an interval in a case in which the user is moving.

(C) The information processing apparatus according to (A) or (B), in which
the display control section adjusts the interval in such a manner that the interval is shorter as a moving speed of the user is higher in the case in which the user is moving.

(D) The information processing apparatus according to any one of (A) to (C), in which
the display control section controls the transmittance of the light control section and the luminance of the predetermined information according to a preset combination.

(E) The information processing apparatus according to (D), in which
the display control section adjusts the transmittance of the light control section by a smaller number of levels than the number of levels for use in changing over the luminance of the predetermined information.

(F) The information processing apparatus according to (D) or (E), in which
brightness of the real space serving as a threshold at a time of a transition from a first state of displaying the predetermined information using a first combination that is one of a plurality of the combinations to a second state of displaying the predetermined information by use of a second combination for use in a case in which the brightness of the real space is higher and brightness of the real space serving as a threshold at a time of a transition from the second state to the first state are set as different degrees of brightness.

(G) The information processing apparatus according to (F), in which
the brightness of the real space serving as the threshold at the time of the transition from the first state to the second state is higher than the brightness of the real space serving as the threshold at the time of the transition from the second state to the first state.

(H) The information processing apparatus according to any one of (A) to (G), further including:
an illuminance sensor, in which
the display control section controls the transmittance of the light control section and the luminance of the predetermined information according to brightness of the real space detected by the illuminance sensor.

(I) The information processing apparatus according to any one of (A) to (G), further including:
an imaging section that images the real space, in which
the display control section controls the transmittance of the light control section and the luminance of the predetermined information according to brightness of the real space identified by analyzing an image captured by the imaging section.

(J) The information processing apparatus according to any one of (A) to (G), in which
the display control section controls the transmittance of the light control section and the luminance of the predetermined information according to brightness of the real space after passage of a predetermined period of time, the brightness being predicted on the basis of a moving speed as the state of the user.

(K) The information processing apparatus according to (J), in which
the display control section controls the transmittance of the light control section and the luminance of the predetermined information, in a case in which the moving speed of the user is high, according to the brightness of the real space after passage of the predetermined period of time that is predicted by setting a period of time that is shorter than a period of time in a case in which a moving speed of the user is slow as the predetermined period of time.

(L) The information processing apparatus according to (J) or (K), in which the display control section controls the transmittance of the light control section and the luminance of the predetermined information according to the brightness of the real space after passage of the predetermined period of time, the brightness being predicted on the basis of a position of the user that is the state of the user.

(M) The information processing apparatus according to (L), further including:

an imaging section that images the real space; and a prediction section that predicts the brightness of the real space on the basis of the position of the user identified by analyzing an image captured by the imaging section.

(N) The information processing apparatus according to (L), further including:

a positioning section that measures a current position; and a prediction section that predicts the brightness of the real space on the basis of the position of the user measured by the positioning section.

(O) The information processing apparatus according to any one of (A) to (M), in which the information processing apparatus includes a head mounted display worn on a head of the user.

(P) An information processing method performed by an information processing apparatus, in which the information processing apparatus has a light control section that guides light in a real space to eyes of a user at predetermined transmittance, and a display section that displays predetermined information in a visually recognizable state while superimposing the predetermined information on the real space, the information processing method including:

exercising control over the transmittance of the light control section and luminance of the predetermined information displayed by the display section according to brightness of the real space, at an interval according to a state of the user.

(Q) A recording medium recording a program for causing a computer in an information processing apparatus to execute processing, in which the information processing apparatus has a light control section that guides light in a real space to eyes of a user at predetermined transmittance, and a display section that displays predetermined information in a visually recognizable state while superimposing the predetermined information on the real space, the recording medium recording the program for causing the computer in the information processing apparatus to execute the processing including:

exercising control over the transmittance of the light control section and luminance of the predetermined information displayed by the display section according to brightness of the real space, at an interval according to a state of the user.

REFERENCE SIGNS LIST

1 HMD, 2 Content delivery server, 3 Network, 11 Display section, 14 Light control element, 51 Control section, 52 Motion sensor, 53 Camera, 54 Illuminance sensor, 55 Communication section, 56 Memory, 57 Video display section, 71 Acceleration sensor, 72 Gyro sensor, 81 Position/posture estimation section, 82 Surrounding environment recognition section, 83 Imaging control section, 84 Display control section, 85 Counter, 101 Transmittance control section, 102 Display luminance control section, 111 Image analysis section, 121 Location information processing section

The invention claimed is:

1. An information processing apparatus, comprising:
circuitry configured to:
acquire environmental information that includes information associated with an environment, wherein
the environment includes a plurality of objects present in a real space, and
the environmental information includes information associated with at least one of a position of each of the plurality of objects, a distance of each of the plurality of objects from a user, a height of each of the plurality of objects, or a type of each of the plurality of objects;
control display of specific information in a visually recognizable state by superimposition of the specific information on the real space;
control display of form information based on the acquired environmental information and occurrence of a change in brightness of the real space, wherein
the change in the brightness is higher than a threshold value,
the form information represents a form of each of the plurality of objects,
the form information representing the form of a first object of the plurality of objects is displayed in a first color,
the form information representing the form of a second object of the plurality of objects is displayed in a second color different from the first color, and
the distance of the first object from the user is different from the distance of the second object from the user;
calculate a degree of hazard of each object of the plurality of objects based on a posture of the user;
change a display method of the form information based on the calculated degree of hazard;
decrease luminance of the displayed form information based on dark adaptation characteristics of the user; and
gradually raise a color temperature of the displayed form information based on the dark adaptation characteristics of the user.

2. The information processing apparatus according to claim 1, wherein the circuitry is further configured to control a change in the luminance of the form information based on at least one of attributes of the user or a state of the user including at least one of a position or the posture of the user.

3. The information processing apparatus according to claim 1, wherein the circuitry is further configured to control display of a contour line of the plurality of objects as the form information.

4. The information processing apparatus according to claim 1, wherein the circuitry is further configured to:
calculate the degree of hazard of each of the plurality of objects further based of at least one of a position of the user and irregularities of each of the plurality of objects; and
control the display of the form information based on the calculated degree of hazard.

5. The information processing apparatus according to claim 4, wherein the circuitry is further configured to:
control display of a contour line of each of the plurality of objects as the form information; and change at least any of a type, a thickness, or a gray level of the contour line based on the degree of hazard.

6. The information processing apparatus according to claim 1, wherein the circuitry is further configured to control the display of the form information that represents feature points of the plurality of objects.

7. The information processing apparatus according to claim 1, further comprising a light control element that includes:
   a first transparent electrode;
   a second transparent electrode; and
   an electrochromic element between the first transparent electrode and the second transparent electrode, wherein
      the light control element is configured to guide light in the real space to eyes of the user at a specific transmittance, and
      the circuitry is further configured to control, based on the occurrence of the change in the brightness of the real space that is higher than the threshold value, the light control element to raise transmittance of the light control element.

8. The information processing apparatus according to claim 7, further comprising a head mounted display wearable on a head of the user.

9. The information processing apparatus according to claim 1, further comprising a camera configured to image the real space,
   wherein the circuitry is further configured to increase a gain and an exposure time of the camera based on the occurrence of the change in the brightness of the real space that is higher than the threshold value.

10. The information processing apparatus according to claim 1, wherein the circuitry is further configured to display the form information as an alternative to the specific information displayed before the occurrence of the change in the brightness.

11. The information processing apparatus according to claim 1, wherein the circuitry is further configured to end the display of the form information based on the brightness of the real space that is equal to a specific brightness.

12. The information processing apparatus according to claim 1, the circuitry is further configured to determine the dark adaptation characteristics of the user based on attributes of the user that include at least one of an age of the user, an eyesight of the user, or a gender of the user.

13. An information processing method, comprising:
   acquiring, by an information processing apparatus, environmental information that includes information associated with an environment, wherein
      the environment includes a plurality of objects present in a real space, and
      the environmental information includes information associated with at least one of a position of each of the plurality of objects, a distance of each of the plurality of objects from a user, a height of each of the plurality of objects, or a type of each of the plurality of objects;
   controlling, by the information processing apparatus, display of specific information in a visually recognizable state by superimposition of the specific information on the real space;
   controlling, by the information processing apparatus, display of form information based on the acquired environmental information and occurrence of a change in brightness of the real space, wherein
      the change in the brightness is higher than a threshold value,
      the form information represents a form of each of the plurality of objects,
      the form information representing the form of a first object of the plurality of objects is displayed in a first color,
      the form information representing the form of a second object of the plurality of objects is displayed in a second color different from the first color, and
      the distance of the first object from the user is different from the distance of the second object from the user;
   calculating a degree of hazard of each object of the plurality of objects based on a posture of the user;
   changing a display method of the form information based on the calculated degree of hazard;
   decreasing, by the information processing apparatus, luminance of the displayed form information based on dark adaptation characteristics of the user; and
   gradually raising a color temperature of the displayed form information based on the dark adaptation characteristics of the user.

14. A non-transitory computer-readable medium having stored thereon, computer-executable instructions which, when executed by a processor, cause the processor to execute operations, the operations comprising:
   acquiring environmental information that includes information associated with an environment, wherein
      the environment includes a plurality of objects present in a real space, and
      the environmental information includes information associated with at least one of a position of each of the plurality of objects, a distance of each of the plurality of objects from a user, a height of each of the plurality of objects, or a type of each of the plurality of objects;
   controlling display of specific information in a visually recognizable state by superimposition of the specific information on the real space;
   controlling display of form information based on the acquired environmental information and occurrence of a change in brightness of the real space, wherein
      the change in the brightness is higher than a threshold value,
      the form information represents a form of each of the plurality of objects,
      the form information representing the form of a first object of the plurality of is displayed in a first color,
      the form information representing the form of a second object of the plurality of objects is displayed in a second color different from the first color, and
      the distance of the first object from the user is different from the distance of the second object from the user;
   calculating a degree of hazard of each object of the plurality of objects based on a posture of the user;
   changing a display method of the form information based on the calculated degree of hazard;
   decreasing luminance of the displayed form information based on dark adaptation characteristics of the user; and
   gradually raising a color temperature of the displayed form information based on the dark adaptation characteristics of the user.

* * * * *